US012552861B2

(12) United States Patent
Wei et al.

(10) Patent No.: US 12,552,861 B2
(45) Date of Patent: Feb. 17, 2026

(54) MONOCLONAL ANTIBODY

(71) Applicant: National Taiwan University, Taipei (TW)

(72) Inventors: Ling-Hung Wei, Taipei (TW); Kuo-Tai Hua, Taipei (TW); Min-Wei Chen, Taipei (TW); Chun-Chi Chou, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 633 days.

(21) Appl. No.: 17/938,543

(22) Filed: Oct. 6, 2022

(65) Prior Publication Data

US 2023/0112794 A1   Apr. 13, 2023

Related U.S. Application Data

(60) Provisional application No. 63/253,567, filed on Oct. 8, 2021.

(51) Int. Cl.
   *C07K 16/24*   (2006.01)
   *C12N 15/63*   (2006.01)

(52) U.S. Cl.
   CPC ............. *C07K 16/248* (2013.01); *C12N 15/63* (2013.01); *C07K 2317/565* (2013.01); *C07K 2317/92* (2013.01)

(58) Field of Classification Search
   None
   See application file for complete search history.

(56) References Cited

FOREIGN PATENT DOCUMENTS

WO   WO-2014187743 A1 * 11/2014 ............... A61P 43/00
WO   WO-2021180821 A2 *  9/2021 ......... A61K 39/3955

OTHER PUBLICATIONS

Sela-Culang et al. The structural basis of antibody-antigen recognition. Fron. Immuno., vol. 4, Article 302, Oct. 2013. (Year: 2013).*
Koenig. Mutational landscape of antibody variable domains reveals a switch modulating the interdomain conformational dynamics and antigen binding. PNAS, E486-E4995, Jan. 5, 2017. (Year: 2017).*
Herold et al. Determinants of the assembly and function of antibody variable domains. Nature Scientific Reports, 7:12276, Sep. 25, 2017. (Year: 2017).*

* cited by examiner

*Primary Examiner* — Julie Wu
*Assistant Examiner* — Amy M. Chattin
(74) *Attorney, Agent, or Firm* — MUNCY, GEISSLER, OLDS & LOWE, P.C.

(57) ABSTRACT

The present invention discloses an monoclonal antibody, which can bind to HyIL-6 with the binding constant $2.86 \times 10^{-10}$ and significantly inhibit IL-6/IL-6R/gp130 complex formation. In addition, the monoclonal antibody of the present invention effectively inhibits HyIL-6-stimulated signal transducer and activator of transcription 3 (STAT3) activation and related vascular endothelial growth factor (VEGF) induction. Data from hydrogen deuterium exchange mass spectrometry (HDX-MS) demonstrate that the antibody of the present invention mainly binds to site IIIa of IL-6 and blocks the final step in the interaction between gp130 and IL-6/IL-6R complex. Additionally, data from ELISA binding assays and kinetics assays indicate that the antibody of the present invention interacts simultaneously with IL-6 and IL-6R, while it does not interact with IL-6R alone. The unique features of the antibody of the present invention offer a novel alternative for IL-6 blockade and illuminate a better therapeutic intervention targeting IL-6.

10 Claims, 21 Drawing Sheets

Specification includes a Sequence Listing.

(a)

(a)

(c)

(b)

(b)

```
IL-6R/IL-6
  1 LAPRRCPAQE VARGVLTSLP GDSVTLTCPG VEPEDNATVH WVLRKPAAGS
 51 HPSRWAGMGR RLLLRSVQLH DSGNYSCYRA GRPAGTVHLL VDVPPEEPQL
101 SCFRKSPLSN VVCEWGPRST PSLTTKAVLL VRKFQNSPAE DFQEPCQYSQ
151 ESQKFSCQLA VPEGDSSFYI VSMCVASSVG SKFSKTQTFQ GCGILQPDPP
201 ANITVTAVAR NPRWLSVTWQ DPHSWNSSFY RLRFELRYRA ERSKTFTTWM
251 VKDLQHHCVI HDAWSGLRHV VQLRAQEEFG QGEWSEWSPE AMGTPWTESR
301 SPPAENEVST PMQALTTNKD DDNILFRDSA NATSLPVQDG GGSGGGSGGG
351 SVPPGEDSKD VAAPHRQPLT SSERIDKQIR YILDGISALR KETCNKSNMC
401 ESSKEALAEN NLNLPKMAEK DGCFQSGFNE ETCLVKIITG LLEFEVYLEY
451 LQNRFESSEE QARAVQMSTK VLIQFLQKKA KNLDAITTPD PTTNASLLTK
501 LQAQNQWLQD MTTHLILRSF KEFLQSSLRA LRQM
```

Figure 9 (Continued)

MONOCLONAL ANTIBODY

CROSS REFERENCE TO RELATED APPLICATIONS

This application claims priority of U.S. Provisional Application No. 63/253,567 filed on Oct. 8, 2021 under 35 U.S.C. § 119(e), the entire contents of which are hereby incorporated by reference.

REFERENCE TO AN ELECTRONIC SEQUENCE LISTING

The contents of the electronic sequence listing (P212096US-SEQ.xml; Size: 115,200 bytes; and Date of Creation: Oct. 4, 2022) is herein incorporated by reference in its entirety.

FIELD OF THE INVENTION

The present invention relates to the discovery and characterization of monoclonal antibody, a novel therapeutic antibody with a greater affinity to bind to the IL-6/IL-6Ra complex over IL-6 and thereby interfere with the fully functioning receptor complex by blocking interaction with gp130 (site III).

BACKGROUND OF THE INVENTION

Interleukin-6 (IL-6), identified initially as B cell stimulatory factor 2, is a pivotal cytokine with a diverse repertoire of functions in normal physiology and disease. IL-6 mediates several biological functions in a wide variety of physiological processes, including energy homeostasis, bone metabolism, acute phase response, regenerative processes, and neural function. As an essential member of the cytokine network, IL-6 plays a central role in acute inflammation and links innate to acquired immune response. Excessive synthesis of IL-6 is critically involved in the cytokine release syndrome (CRS) elicited by immune-related therapy such as chimeric antigen receptor T-cell (CAR-T) therapy and in viral infections including severe acute respiratory syndrome coronavirus 2 (SARS-CoV-2). CRS is a potentially life-threatening systemic inflammatory response, and IL-6 blockade has been shown to reverse CRS associated with novel T cell-engaging therapies and SARS-CoV-2. In addition, IL-6 plays a central role in the transition from neutrophil to monocyte recruitment during inflammation, and dysregulated IL-6 essentially contributes to perpetuating tissue damage in chronic inflammatory diseases and auto-immune diseases. The therapeutic efficacy of IL-6 targeted therapy has substantiated the significant pathogenic role of IL-6 in rheumatoid arthritis, systemic juvenile idiopathic arthritis, polyarticular juvenile idiopathic arthritis, and giant cell arteritis. Furthermore, excessive IL-6 production in the germinal center of hyperplastic lymph nodes drives the array of clinical manifestations in Castleman disease. In 2014, IL-6-targeted therapy was approved for multicentric Castleman disease. These studies, taken together, validate the IL-6 signaling pathway as an essential molecular therapeutic target.

IL-6 target cells express a low-affinity receptor (IL-6Rα) devoid of transducing activity on their surface. The binding of IL-6 to IL-Rα is followed by an association with a second membrane protein of the same cell, gp130, which dimerizes and initiates intracellular signaling. The signal transduction within the cell involves activation of the Janus kinase (JAK) and activator of transcription (STAT) pathway and the RAS-dependent mitogen-activated protein kinase (MAPK) signaling cascade. This so-called classic signaling is relevant only in a few cell types (hepatocytes, some epithelial cells, and leukocytes), which express IL-6Rα. A key feature in regulating the many biological activities assigned to IL-6 has been identifying a soluble IL-6Rα (sIL-6Rα). The sIL-6Rα forms an agonistic complex with IL-6 that binds ubiquitous transmembrane gp130 to trigger cellular responses (IL-6 trans-signaling). Notably, the pathogenic role of IL-6 trans-signaling has been increasingly implicated in several inflammatory diseases, autoimmune diseases, and inflammation-associated cancers. Alternatively, IL-6/IL-6Rα has been discovered to present to neighboring cells, called IL-6 trans-presentation, which occurs in the context of the antigen-specific interaction of dendritic cells (DCs) with T cells. Specifically, the IL-6-IL-6Rα complex is formed in intracellular compartments of DCs and then presents to the cell surface, which subsequently induces signaling from gp130 expressed on CD4$^+$ cells to generate a highly tissue-destructive phenotype, T helper 17 cells. These three modes of IL-6 signaling are not functionally redundant in mediating IL-6's pleiotropic functions, suggesting that selective blockade of different modes of IL-6 signaling has different outcomes on disease pathology. Given the complex biology of IL-6, suppressing trans-signaling and trans-presentation while sparing the homeostatic functions of IL-6 classic signaling would be a crucial therapeutic strategy for IL-6 blockade.

The crystallographic data analysis for IL-6 signaling assembly revealed that the complex ternary forms a hexamer containing two IL-6, two IL-6Rα, and two gp130, which assemble sequentially and cooperatively. IL-6 is a four-alpha-helix bundle cytokine. IL-6 first interacts with the D3/D2 domain of IL-6Rα to form the initial IL-6/IL-6Rα binary complex through the site I binding epitope located in the A and D helices. The IL-6/IL-6Rα complex comprises a composite epitope (sites IIa & IIb) that interacts with the gp130 cytokine-binding-homology region (CHR). Site IIa is between the IL-6 A and C helical faces and the gp130 CHR. Site IIb is between the IL-6Rα D3 domain and the gp130 D3 domain, which provides additional surfaces to enhance the overall binding affinity. The subsequent assembly of the functional IL-6 hexamer signaling complex requires a third receptor-binding epitope, site III. Site Ma possesses a broad interface between the tip of the IL-6 four-helix bundle and the D1 domain of gp130. In contrast, IIIb is between the tip of the gp130 D1 domain and the D2 domain of IL-6Rα. Several inhibitors targeting the defined epitope regions of the IL-6 receptor complex display distinct modes of action. For example, when inhibitory antibodies bind to either IL-6 site I (Siltuximab; Sirukumab; Clazakizumab) or IL-6Rα D3/D2 (Tocilizumab; Sarilumab), it blocks the binding of IL-6 to IL-6Rα resulting in blockade of both classic and trans-signaling of IL-6, but not IL-6 trans-presentation. In contrast, the anti-IL-6 antibody olokizumab binds to site Ma of IL-6 and interferes with the fully functioning receptor complex by blocking the interaction with gp130. Furthermore, Olamkicept (sgp130Fc) exclusively inhibits IL-6 trans-signaling by interference with the binding of site II & site III of the IL-6/IL-Rα complex with gp130. The action of these inhibitors yields differences in pharmacokinetics and efficacy under various disease states. More importantly, it remains largely unknown whether blockade of different functional epitopes within the IL-6/IL-6Rα/gp130 structure may translate into unique clinical benefit.

SUMMARY OF THE INVENTION

The summary of the invention aims to provide a simplified summary of the disclosure, so that the reader has a basic understanding of the disclosure. This summary of the invention is not a complete overview of the disclosure, and it is not intended to point out important/critical elements of embodiments of the invention or define the scope of the invention.

In view of the deficiencies and shortcomings of conventional techniques in the treatment of diseases associated with dysregulated IL-6 expression, the primary objective of the present invention is to provide a monoclonal antibody (herein after may be referred as C14mab) having specificity for the human interleukin-6 (IL-6)/interleukin-6 receptor (IL-6R) complex.

Further, said monoclonal antibody specifically binds to an epitope within IL-6, and said epitope comprises an amino acid sequence of SEQ ID NO: 1.

Further, said monoclonal antibody specifically binds to an epitope within IL-6R, and said epitope comprises an amino acid sequence of SEQ ID NO: 2.

Further, said monoclonal antibody comprises a light chain (L chain) variable region (VL region), and said VL region comprises a complementary determining region 1 (CDR-L1) comprising an amino acid sequence of SEQ ID NO: 3.

Further, said VL region comprises a complementary determining region 2 (CDR-L2) comprising an amino acid sequence of SEQ ID NO: 4.

Further, said VL region comprises a complementary determining region 3 (CDR-L3) comprising an amino acid sequence of SEQ ID NO: 5.

Further, said monoclonal antibody comprises a heavy chain variable region (VH region), and said VH region comprises a complementary determining region 1 (CDR-H1) comprising an amino acid sequence of SEQ ID NO: 6.

Further, said VH region comprises a complementary determining region 2 (CDR-H2) comprising an amino acid sequence of SEQ ID NO: 7.

Further, said VH region comprises a complementary determining region 3 (CDR-H3) comprising an amino acid sequence of SEQ ID NO: 8.

Further, said VL region comprises an amino acid sequence of SEQ ID NO: 9.

Further, said VH region comprises an amino acid sequence of SEQ ID NO: 10.

Another objective of the present invention is to provide a pharmaceutical composition comprising the monoclonal antibody described above.

Another objective of the present invention is to provide a nucleic acid molecule encoding the monoclonal antibody described above.

Another objective of the present invention is to provide a vector comprising the nucleic acid molecule described above.

Another objective of the present invention is to provide a cell comprising the nucleic acid molecule described above or expressing the nucleic acid molecule described above.

Another objective of the present invention is to provide a method for treatment of IL-6/IL-6R mediated diseases comprising administering a therapeutically effective amount of the monoclonal antibody described above to a subject in need of such treatment.

After referring to the following embodiments, those with ordinary knowledge in the technical field to which the present invention pertains to can easily understand the basic spirit of the present invention and its purpose, as well as the technical means and implementation aspects adopted by the present invention.

BRIEF DESCRIPTION OF THE DRAWINGS

In order to make the above and other objects, features, advantages and embodiments of the present invention more obvious and understandable, the drawings are described as follows.

DETAILED DESCRIPTION OF THE INVENTION

Figure 1:
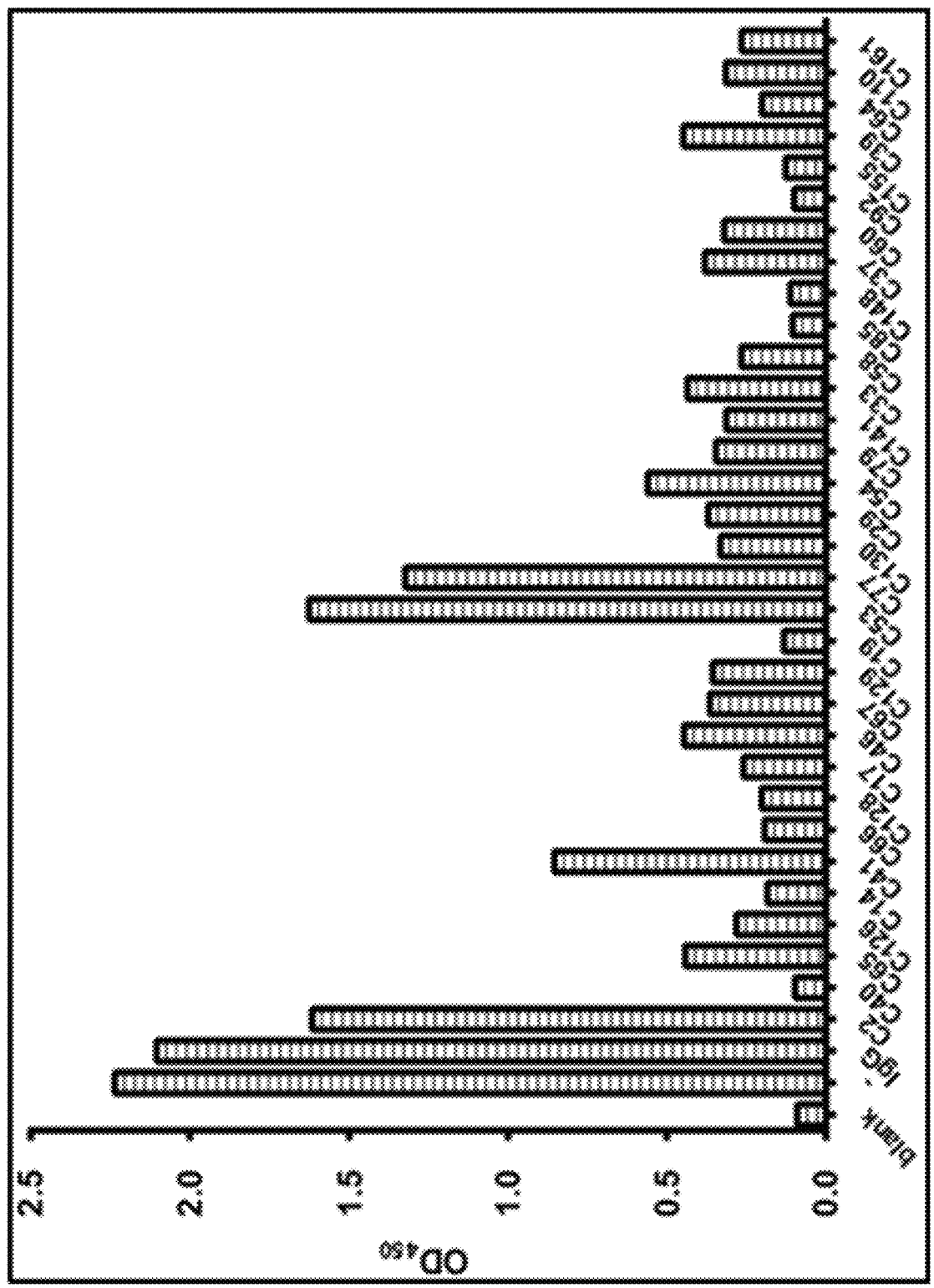
FIG. 1 illustrates representative results of hybridoma screening by competitive ELISA. The culture supernatants from hybridomas were mixed with HyIL-6 for analysis. The color formation is reported as an absorbance ($OD_{450}$) observed for each hybridoma. The top 10 ranking antibodies were selected as antibody candidates based on their ability to neutralize the binding of HyIL-6 and sgp130-Fc. A bar graph showing the absorbance observed for each hybridoma.

In this section, the contents of the present invention will be described in detail through the following examples. These examples are for illustration only, and those skilled in the art can easily think of various modifications and changes. Various embodiments of the present invention will be described in detail below. In this specification and the appended patent applications, unless the context clearly indicates otherwise, "a" and "the" can also be interpreted as plural.

Monoclonal Antibody Targeting IL-6/IL-6Rα

Targeting IL-6 signaling for the treatment of many human diseases has entered clinical practice. However, many questions remain and the features of IL-6 inhibitory antibodies vary considerably based on their mode of blockade. Choosing the suitable antibody with the appropriate mechanism of action against IL-6/IL-6Rα/gp130 signaling for various IL-6 mediated diseases remains a challenge. The present invention shows that C14mab specifically recognizes the epitope containing a critical amino acid residue in site III of IL-6 for the assembly of IL-6/IL-6Rα/gp130 complex assembly, similar to an antibody under current clinical development, Olokizumab. The key difference between C14mab and Olokizumab is that the epitope of C14mab for IL-6/IL-6Rα complex is split spatially across IL-6 and IL-6Rα, thus preferentially binding to IL-6/IL-6Rα complex. Such a unique feature may increase specificity and potential efficacy against various IL-6/IL-6Rα mediated diseases.

Pharmaceutical Compositions

In various embodiments pharmaceutical compositions comprising the antibodies described herein are contemplated. In some embodiments, a pharmaceutical composition formulated for administration in a variety of unit dosage forms depending upon the route of administration. In a preferable embodiments the pharmaceutical composition, containing one or a combination of antibodies described herein, or immunoconjugates thereof, formulated together with a pharmaceutically acceptable carrier are provided.

As used herein, "pharmaceutically acceptable carrier" includes any and all solvents, dispersion media, coatings, antibacterial and antifungal agents, isotonic and absorption delaying agents, and the like that are physiologically compatible. Preferably, the carrier is suitable for intravenous, intramuscular, subcutaneous, parenteral, spinal or epidermal administration (e.g., by injection or infusion).

The pharmaceutical composition comprising the antibodies described herein can be administered by a variety of methods known in the art. As will be appreciated by the skilled artisan, the route and/or mode of administration will vary depending upon the desired results. The active compounds can be prepared with carriers that will protect the compound against rapid release, such as a controlled release formulation, including implants, transdermal patches, and microencapsulated delivery systems. Biodegradable, biocompatible polymers can be used, such as ethylene vinyl acetate, polyanhydrides, polyglycolic acid, collagen, polyorthoesters, and polylactic acid.

Production of Antibodies or Binding Fragments Thereof

In some embodiments, an antibody or its binding fragment thereof is expressed recombinantly, and the nucleic acid encoding the antibody or its binding fragment is assembled from chemically synthesized oligonucleotides, which can involve the synthesis of overlapping oligonucleotides containing portions of the sequence encoding the antibody, annealing and ligation of those oligonucleotides, and then amplification of the ligated oligonucleotides by PCR. Alternatively, a nucleic acid molecule encoding an antibody is optionally generated from a suitable source (e.g., an antibody cDNA library, or cDNA library generated from any tissue or cells expressing the immunoglobulin) by PCR amplification using synthetic primers hybridizable to the 3' and 5' ends of the sequence or by cloning using an oligonucleotide probe specific for the particular gene sequence.

Vectors Comprising the Nucleic Acid of the Antibody and Cells Thereof of the Present Invention In some embodiments, an expression vector comprising the nucleotide sequence of an antibody or the nucleotide sequence of an antibody provided. The vector can be transferred to a host cell by conventional techniques (e.g., electroporation, liposomal transfection, and calcium phosphate precipitation), and the transfected cells are then cultured by conventional techniques to produce the antibody. In specific embodiments, the expression of the antibody is regulated by a constitutive, an inducible or a tissue, specific promoter.

In some embodiments, a variety of host-expression vector systems is utilized to express an antibody described herein. Such host-expression systems represent vehicles by which the coding sequences of the antibody is produced and subsequently purified, but also represent cells that are, when transformed or transfected with the appropriate nucleotide coding sequences, express an antibody or its binding fragment in situ. These include, but are not limited to, microorganisms such as bacteria transformed with recombinant bacteriophage DNA, plasmid DNA or cosmid DNA expression vectors containing an antibody or its binding fragment coding sequences; yeast transformed with recombinant yeast expression vectors containing an antibody or its binding fragment coding sequences; insect cell systems infected with recombinant virus expression vectors containing an antibody or its binding fragment coding sequences; or mammalian cell systems (e.g., COS, CHO, BH, 293, 293T, 3T3 cells) harboring recombinant expression constructs containing promoters derived from the genome of mammalian cells (e.g., metallothionein promoter) or from mammalian viruses (e.g. the adenovirus late promoter; the vaccinia virus 7.5K promoter).

Therapeutic Application

Also provided herein are compositions and methods for treating a subject having an IL-6 or IL-6/IL-6R associated disease or disorder. The method includes administering to the subject a therapeutically effective amount of a composition comprising a formulation described herein. In embodiments, the method includes identifying a subject having an IL-6 associated disease or disorder described herein; and administering to the subject a therapeutically effective amount of a composition comprising a formulation as described herein.

IL-6 associated diseases or disorders, e.g., for treating by administering the compositions or formulations described herein, can be associated with increased or elevated IL-6 expression or activity. In an embodiment, one or more symptoms of the IL-6 associated disease or disorder is associated with increased or elevated IL-6 expression or activity. Increased or elevated IL-6 expression can be determined in a subject as compared to the level of IL-6 expression prior to onset of the disease or a symptom of the disease. Increased or elevated IL-6 expression can be determined in a subject as compared to another subject that does not have an IL-6 associated disease or disorder.

In various embodiment, the IL-6 associated diseases are "IL-6 mediated inflammation" or "IL-6 mediated inflammatory disorder", refers to inflammation or inflammation related disorder in which IL-6 is known or suspected to contribute to the etiology or symptoms of the inflammation. In various embodiments, the patient has kidney disease. In some embodiments, the kidney disease is chronic kidney disease (CKD). In various embodiments, the patient has cardiovascular disease. In various embodiments, the patient has anemia. In some embodiments, the patient has anemia of chronic disease. In some embodiments, the patient has iron-refractory iron-deficiency anemia (IRIDA). In some embodiments, the patient has diabetes. In some embodiments, the patient has liver disease. In some embodiments, the patient has osteoporosis. In some embodiments, the patient has depression. In some embodiments, the patient has asthma. In some embodiments, the patient has neuroinflammatory disorder, such as Alzheimer's disease, Parkinson's disease, multiple sclerosis, and amyotrophic lateral sclerosis (ALS). In some embodiments, the patient has age-related macular degeneration (AMD). In various embodiments, the patient has cancer such as solid tumors, small cell lung cancer, non-small cell lung cancer, hematological cancer, multiple myeloma, leukemia, chronic lymphocytic leukemia (CLL), chronic myeloid leukemia (CML), lymphomas, and Hodgkin's lymphoma. In some embodiments, the patient has skin disease. In some embodiments, the anti-IL-6 antibody formulation prevents aging in the patient.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Generation and Characterization of Anti-HyIL-6 Hybridoma Cells

Figure 2:
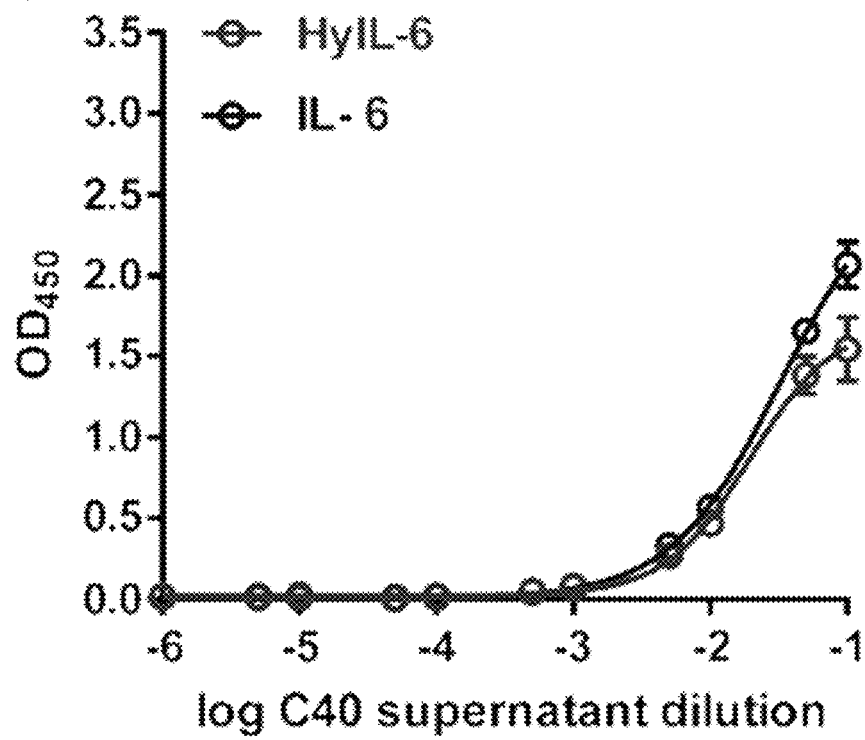
FIG. 2 illustrates binding characteristics of antibodies to IL-6 and HyIL-6 from hybridoma culture supernatants. After the microplates were coated with IL-6 (20 ng/well) or HyIL-6 (60 ng/well) overnight, indirect ELISA was conducted with serial dilution of IgG-normalized hybridoma culture supernatants. The $OD_{450}$ binding curves of hybridoma candidates C40, C14, C85, C92, C148, and C155 were shown in (a-f). Data are compiled from three independent experiments. Values represent the mean±SEM.
Figure 2:
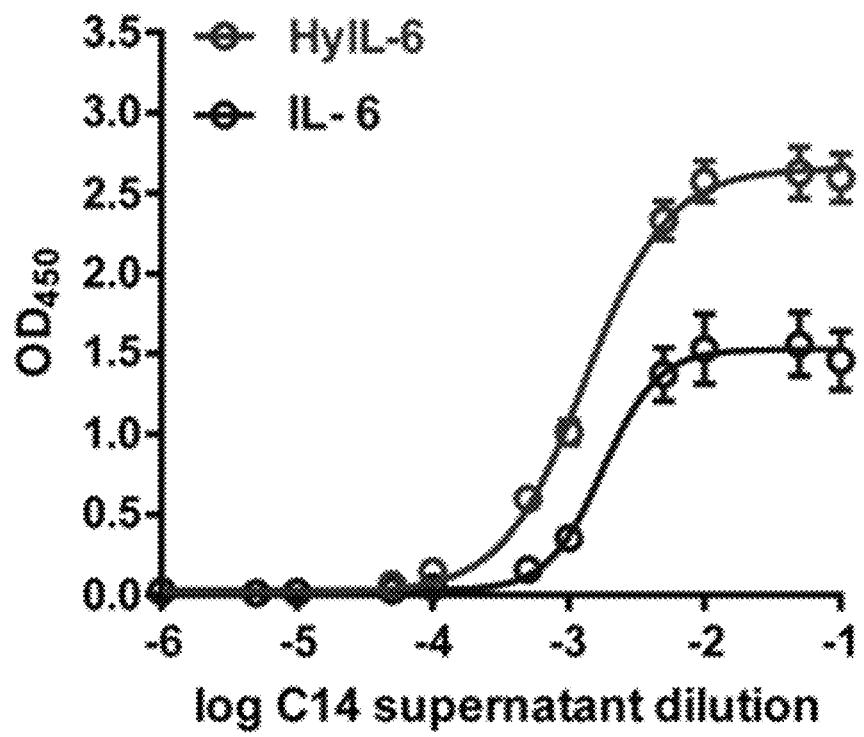
Figure 2:
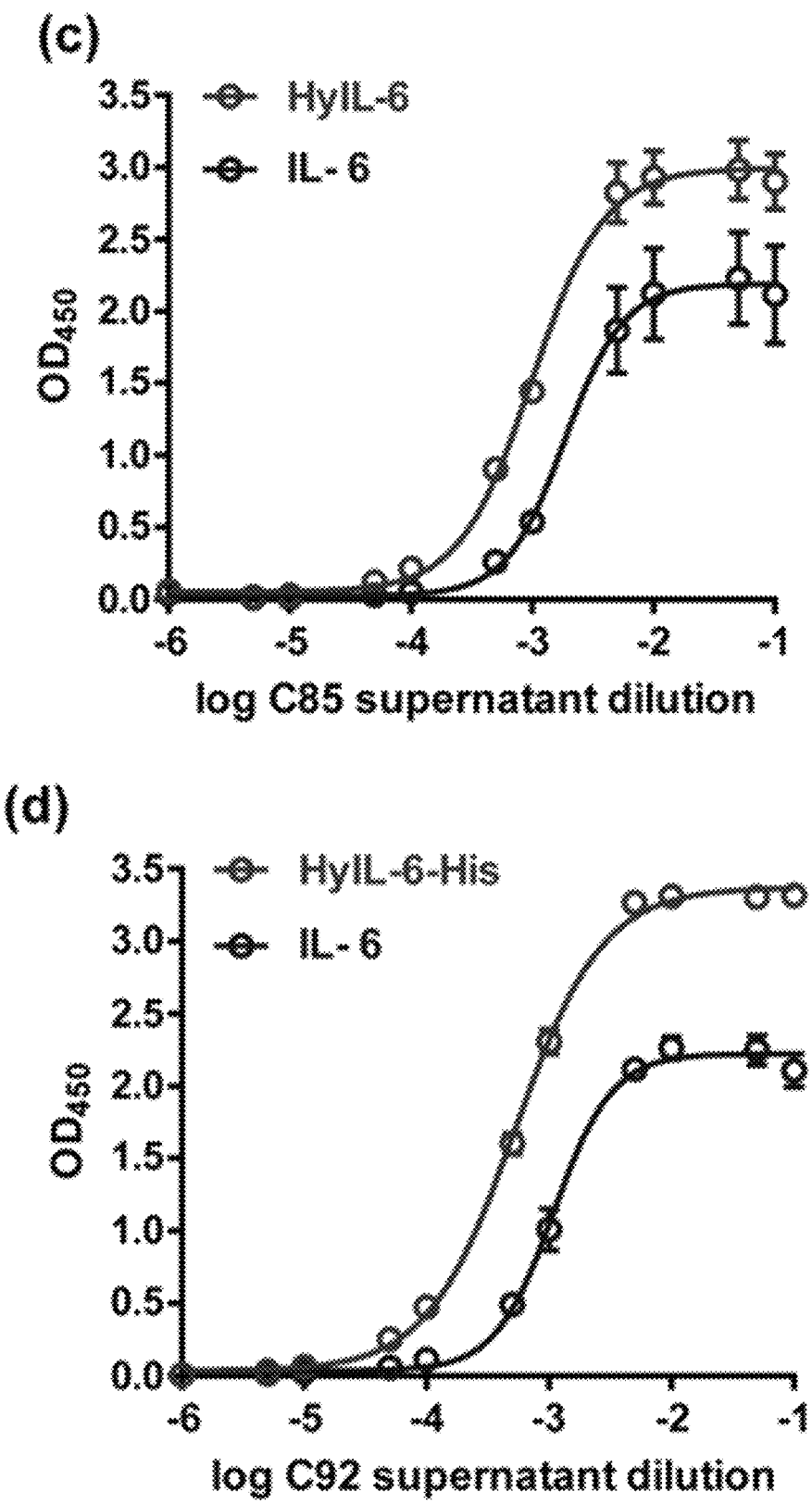
Figure 2:
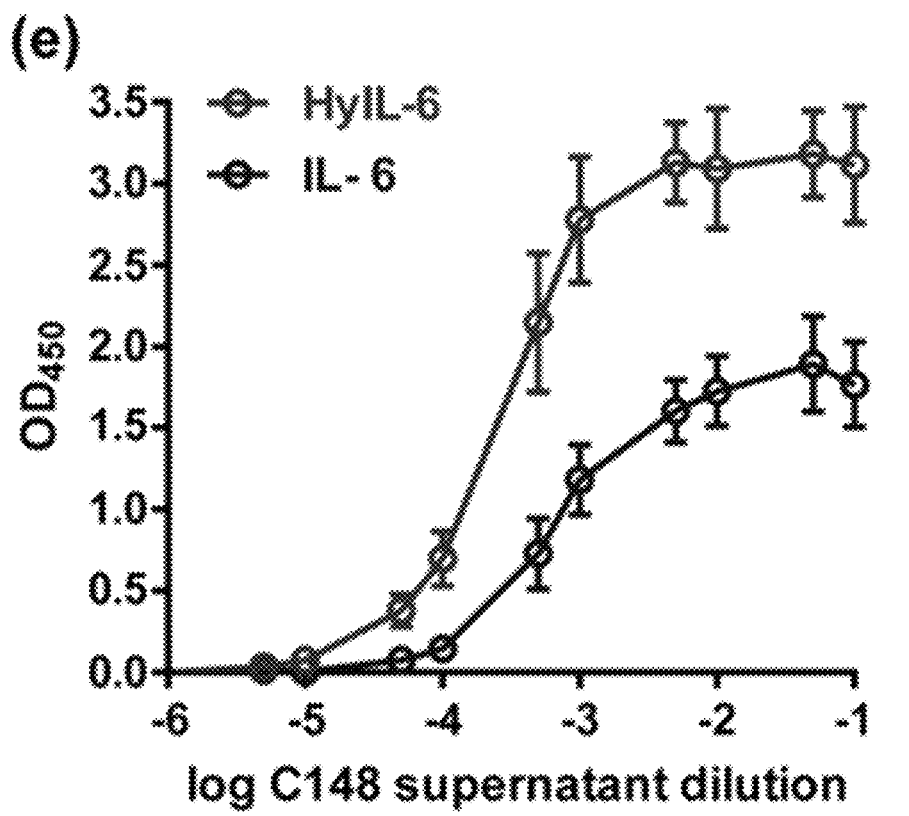
Figure 2:
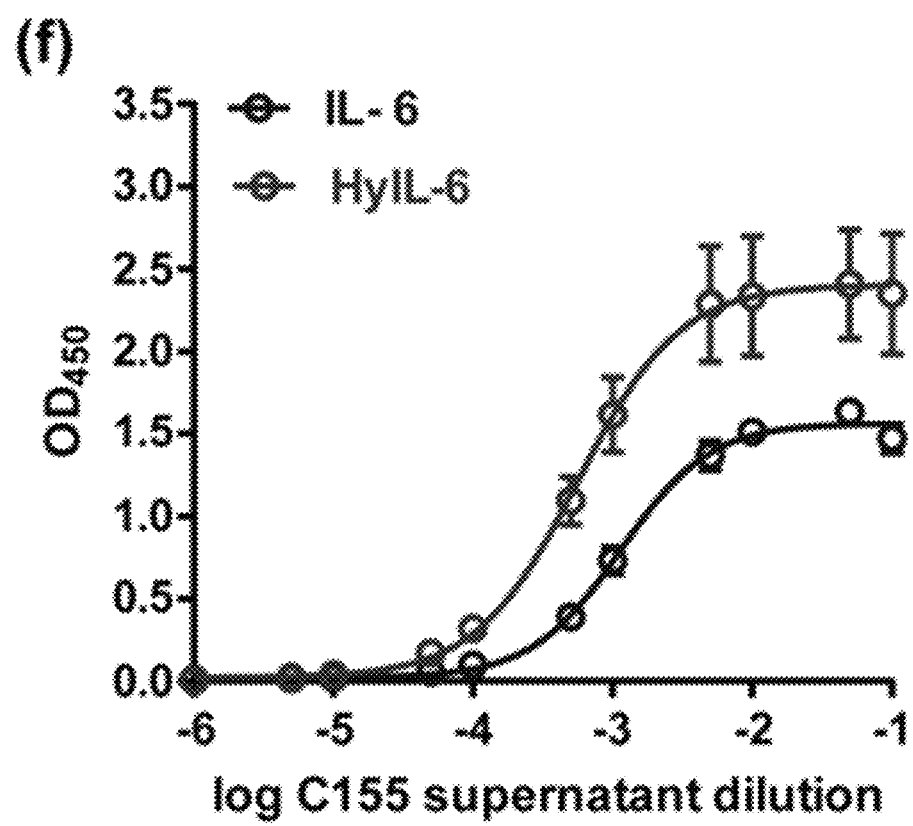

Most antibodies under clinical use or development that target the IL-6 axis prevent IL-6 binding to IL-6Rα and thus neutralize IL-6 activity (site I blockade). To discover novel antibodies that may target other functional epitopes within the IL-6/IL-6Rα/gp130 structure, we immunized mice with recombinant human Hyper-IL-6 (HyIL-6) protein composed by fusing human IL-6 and human sIL-6Rα with a 13-aa linker. Subsequent antibody discoveries led to the generation of 32 hybridoma clones, which recognized HyIL-6 in an initial ELISA screen. Next, supernatants of these 32 hybridoma clones were tested for their ability to block the binding of gp130 to the IL-6/IL-6Rα complex. Theoretically, this approach can screen antibody candidates that target distinct binding sites other than site 1. FIG. 1 shows data generated using competitive ELISA identifying several potential antibody candidates that can significantly interfere with the binding of HyIL-6 with gp130. The top 10 ranking candidates were selected for further characterization of their binding affinity with HyIL-6 and IL-6 using an indirect ELISA assay. FIG. 2 shows representative binding curves for the binding of various antibody candidates to HyIL-6 and IL-6, respectively. Our data revealed that most tested candidates have a superior affinity to HyIL-6, while C40 clone showed similar binding characteristics to IL-6 and HyIL-6.

Figure 3:
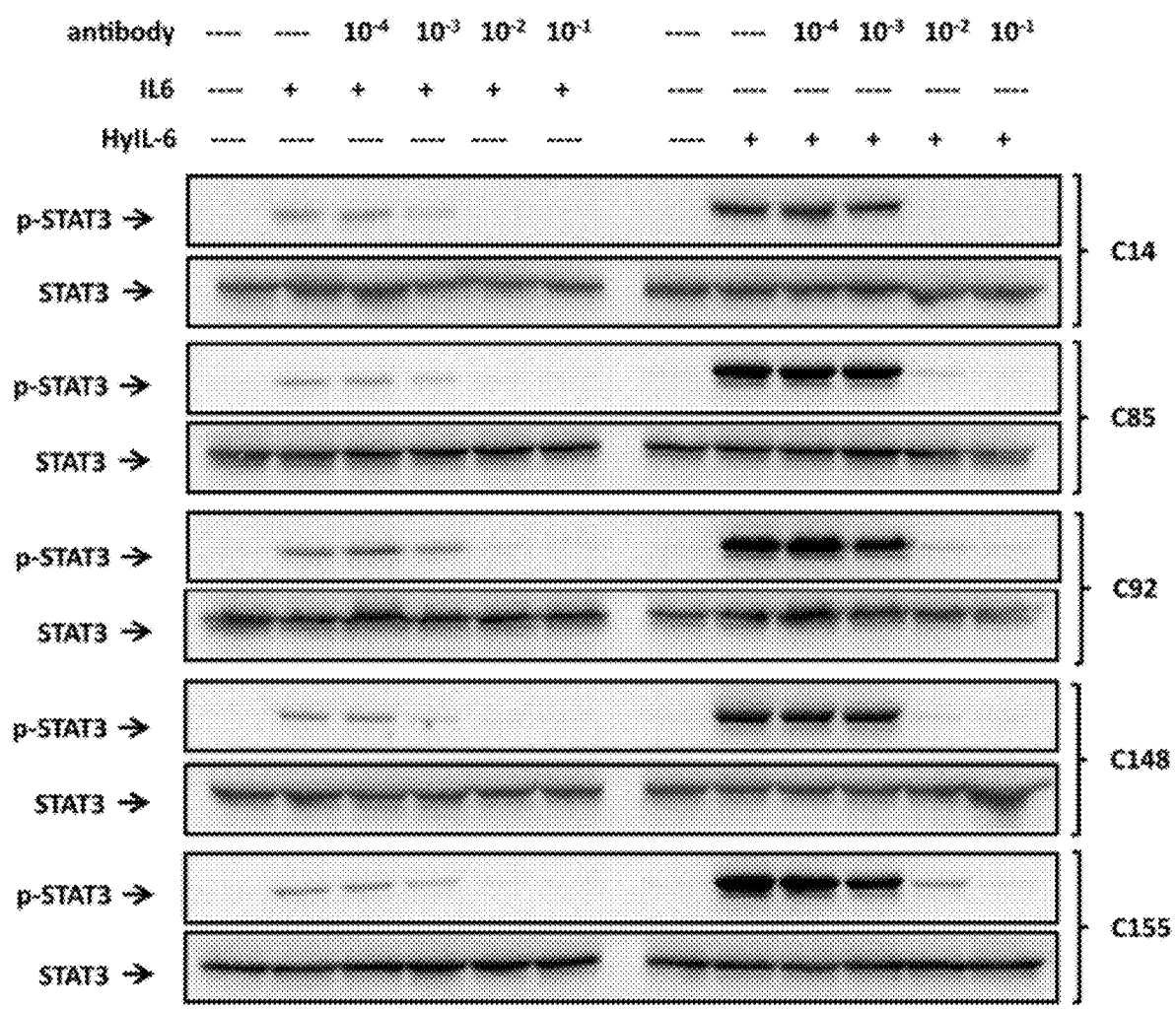
FIG. 3 illustrates the activity of antibody candidates against IL-6 and HyIL-6 in vitro. Hela cells ($1 \times 10^5$ cells/well) were stimulated with the mixture containing recombinant human IL-6 (20 ng/ml) or HyIL-6 (60 ng/ml) at the same molar ratio, with or without serial dilution of the hybridoma culture supernatants. STAT3 activation (p-STAT3) was determined 15 mins after IL-6/HyIL-6 stimulation by Western blot of antibody candidates against IL-6 and HyIL-6 in vitro, with or without serial dilution of various hybridoma culture supernatants.
Figure 3:
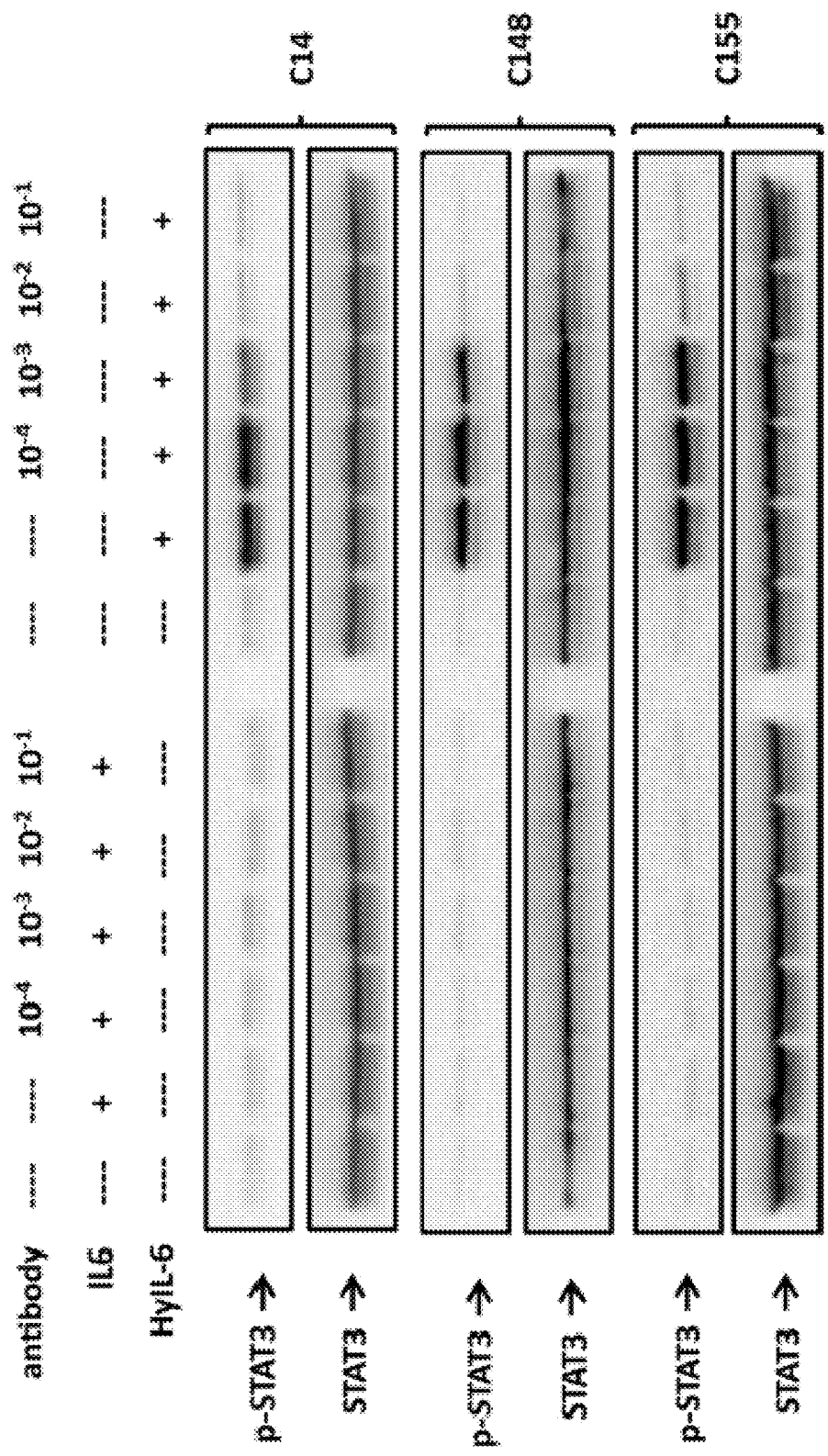
Figure 3:
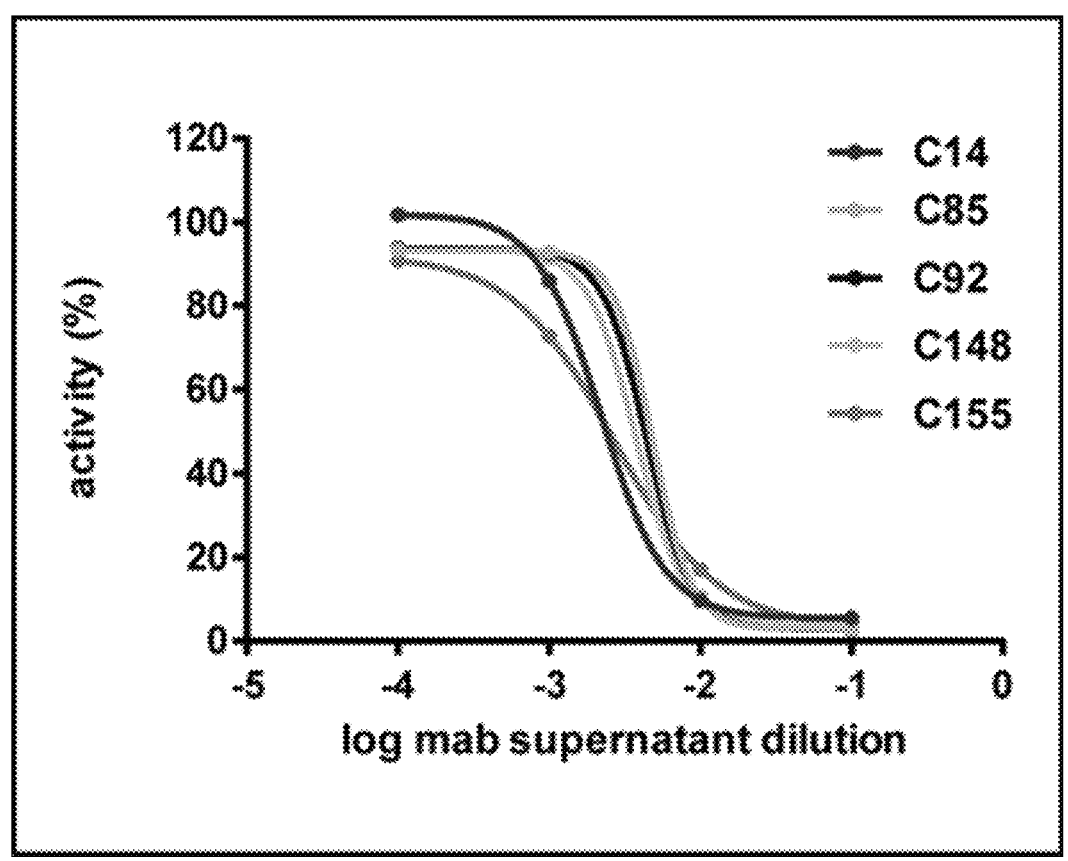

To further verify the inhibitory ability of these antibody candidates to IL-6/HyIL-6 induced signaling on target cells, tyrosine phosphorylation of STAT3 (p-STAT3) was analyzed using immunoblot in HeLa cells which express low levels of IL-6Rα subunit. FIG. 3(a) shows that IL-6 stimulation led to a poor signaling response in HeLa cells, while HyIL-6 stimulation produced a robust STAT3 activation. As expected, both IL-6 and HyIL-6 mediated STAT3 phosphorylation levels were reduced in a dose-dependent manner in the presence of hybridoma supernatants containing antibody candidates. Similar results were obtained with HyIL-6 induced STAT3 activation in the IL-6Rα-null C33A cells (FIG. 3(b)). Notably, the C14 clone showed superior inhibitory activity against HyIL-6 mediated trans-signaling, among others (FIG. 3(c)). We, therefore, selected C14 clone for further development and characterization.

The Binding Affinity of Monoclonal Antibody C14

Figure 4:
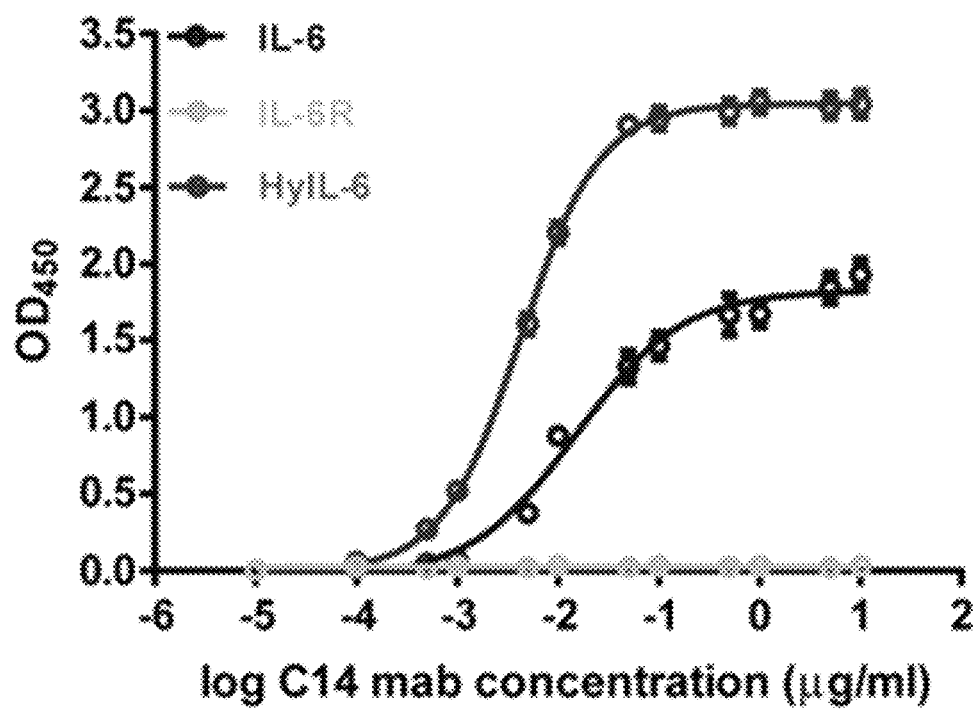
FIG. 4 illustrates the binding characteristics of purified C14mab. (a) The microplates were coated with human IL-6 (20 ng/well), HyIL-6 (60 ng/well), and IL-6 Ra (40 ng/well). Serial dilutions of C14mab were added for 1 hr at room temperature. The binding ELISA data is graphed with $OD_{450}$ readings and their associated binding percentages vs. log antibody concentration. Data are compiled from three independent experiments. Values represent the mean±SEM. (b) Data were normalized to maximum signal for IL-6 and HyIL-6 individually. $EC_{50}$ values were obtained by nonlinear regression fitting to a variable slope, four-parameter dose-response model using the GraphPad Prism™ software (San Diego, CA, USA). (c) The binding of mouse HyIL-6 (60 ng/well) with C14mab was measured by ELISA as described in (a). Values represent the mean±SEM from three independent experiments.
Figure 4:
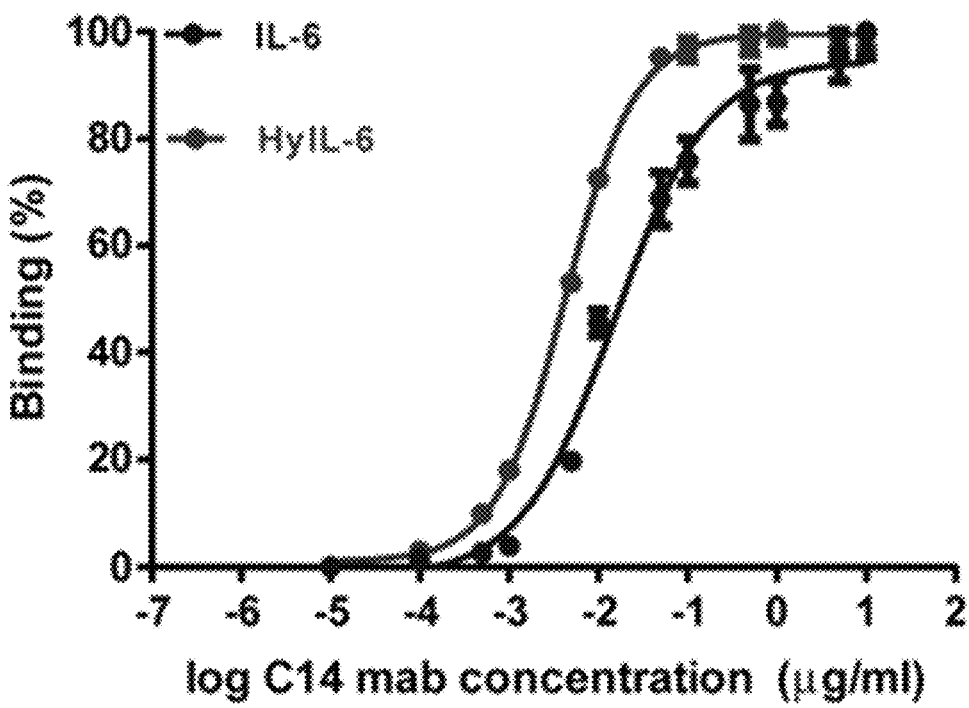
Figure 4:
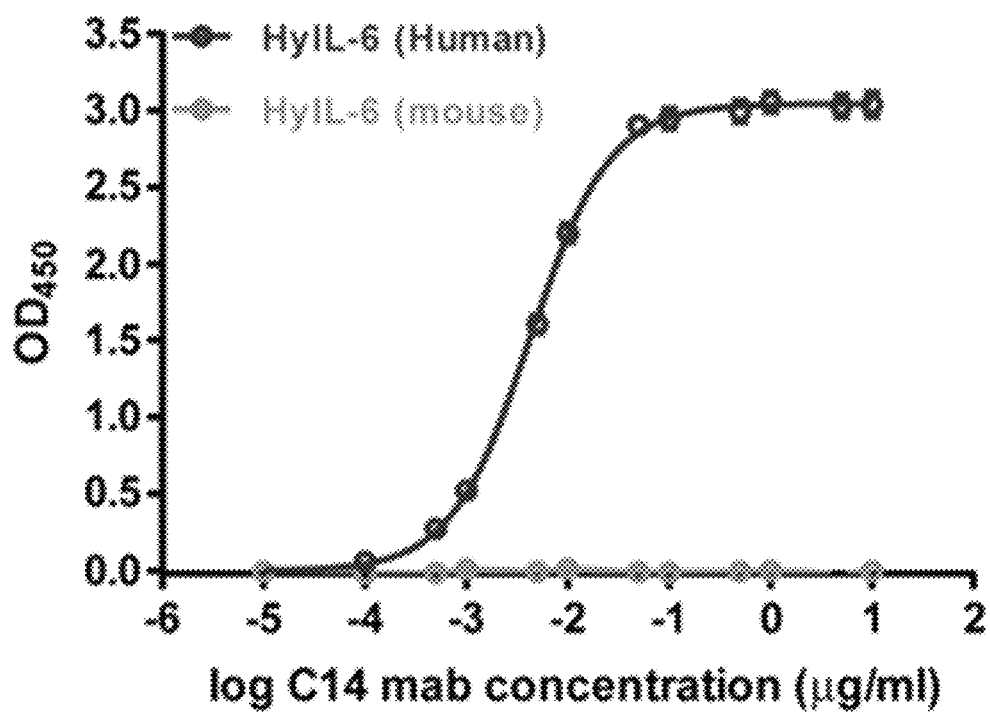

The purified C14 monoclonal antibody (C14mab) was first subjected to the binding experiment with IL-6, IL-6Rα, and HyIL-6 based on ELISA. The representative diagrams of the binding characteristics of C14mab shown in FIG. 4a reveal that C14mab binds to IL-6 and HyIL-6, but not IL-6Rα. Notably, HyIL-6 possessed stronger C14mab binding activity than IL-6 (FIG. 4(b)). ELISA analysis showed the $EC_{50}$ value of C14mab to bind coated HyIL-6 (4.296 ng/ml), which is ~3.5 times stronger than that of IL-6 ($EC_{50}$=15.32 ng/ml), while the maximum OD value of HyIL-6 was also higher obviously than IL-6. Moreover, while C14mab demonstrated high-affinity binding to human HyIL-6, C14mab lacked affinity to mouse HyIL-6, indicating that C14mab does not exhibit cross-species reactivity (FIG. 4(c)).

Figure 5:
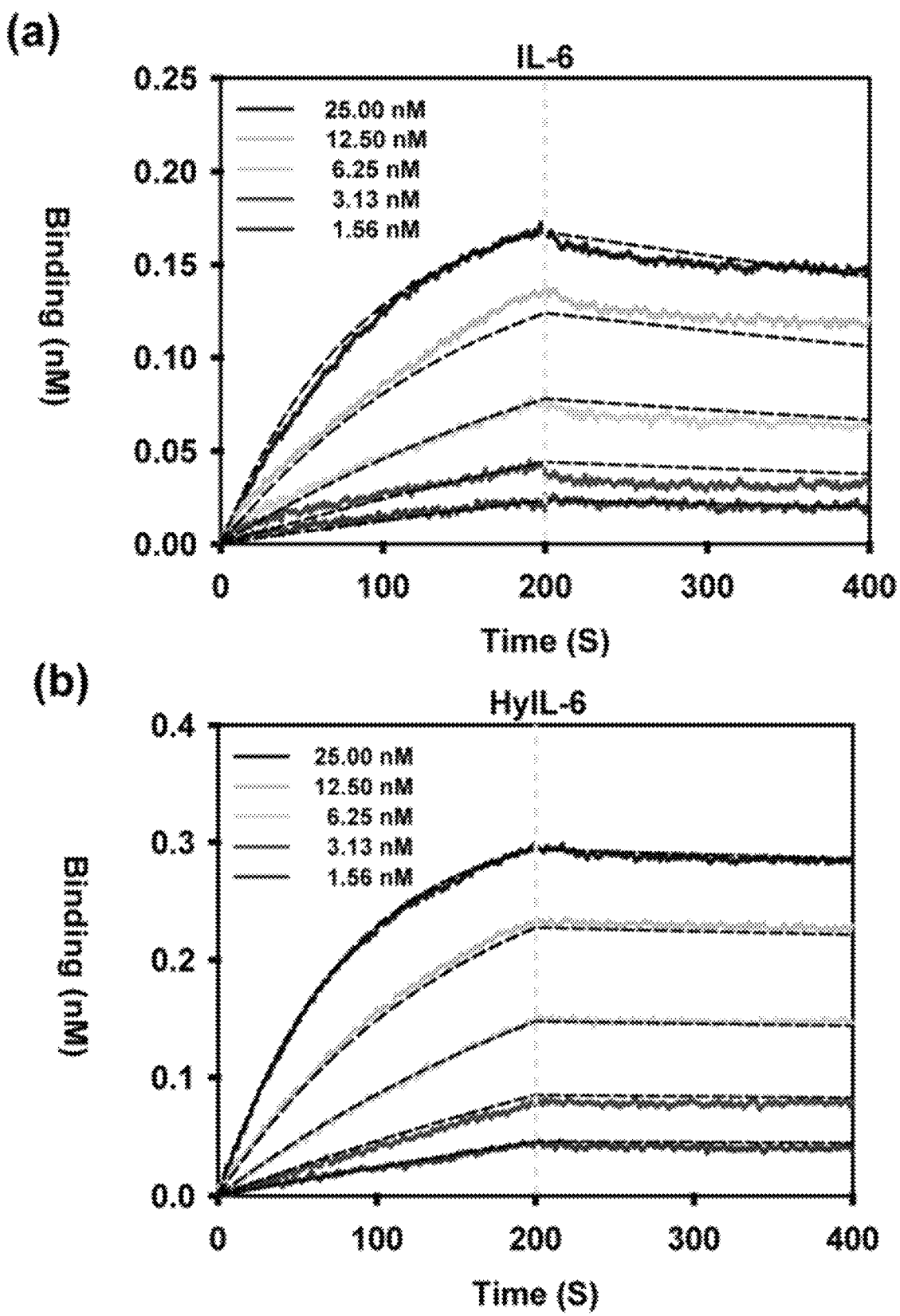
FIG. 5 illustrates the binding kinetics of C14mab. Biolayer interferometry analysis of the binding of C14mab to IL-6 (a) and HyIL-6 (b) was carried out. In brief, C14mab was loaded onto an Octet anti-mouse Fc-capture (AMC) sensor and incubated over a range of concentrations (1.56-25 nM) of IL-6 and HyIL-6, respectively. Kinetic parameters were evaluated by using a 1:1 binding model with global fitting. The experimental curves of each concentration (solid line) are shown alongside the fitted curves (dashedline). One representative set of curves is shown from three independent experiments. Comparative line graphs plotting binding of C14mab (incubated over a range of concentrations 1.56-25 nM) to IL-6 (FIG. a) and HyIL-6 (FIG. b) over time.

We next determined the binding kinetics of the purified C14mab to IL-6 and HyIL-6. The representative sensorgrams are shown in FIG. 5. The binding affinities were $1.13 \times 10^{-9}$ and $2.86 \times 10^{-10}$ for IL-6 and HyIL-6, respectively (Table 1). Indeed, the binding strength of C14mab of HyIL-6 was about four times that of IL-6. The binding characteristics of purified C14mab were consistent with the results from ELISA binding assays. For IL-6, C14mab followed a fast-on ($6.05 \times 10^5$ $M^{-1}s^{-1}$) and slow-off ($6.65 \times 10^{-4}$ $S^{-1}$) binding kinetics, resulting in a $K_D$ of $1.13 \times 10^{-9}$ M. For HyIL-6, C14mab followed a fast-on ($4.98 \times 10^5$ $M^{-1}s^{-1}$) and slow-off ($1.44 \times 10^{-4}$ $S^{-1}$) binding kinetics, resulting in a $K_D$ of $2.86 \times 10^{-10}$ M. The high on-rate of binding was similar, which means that very little energy was required for IL-6 and HyIL-6 to form the complex with C14mab. On the other hand, the off-rate of binding for HyIL-6 was lower than IL-6, meaning the dissociation of C14mab and HyIL-6 was slower, indicating the complex was more stable.

TABLE 1

Kinetic rate constants and equilibrium dissociation constants for the binding interaction of IL-6 and HyIL-6 with C14mab.

| Complex | $K_{on}$ ($M^{-1}S^{-1}$) | $K_{off}$ ($S^{-1}$) | $K_D$ (M) |
|---|---|---|---|
| IL-6-C14mab | 6.05 (±0.91) × $10^5$ | 6.65 (±1.16) × $10^{-4}$ | 1.13 (±0.33) × $10^{-9}$ |
| HyIL-6-C14mab | 4.98 (±0.20) × $10^5$ | 1.44 (±0.42) × $10^{-4}$ | 2.86 (±0.72) × $10^{-10}$ |

Neutralization Activity of C14mab

Figure 6:
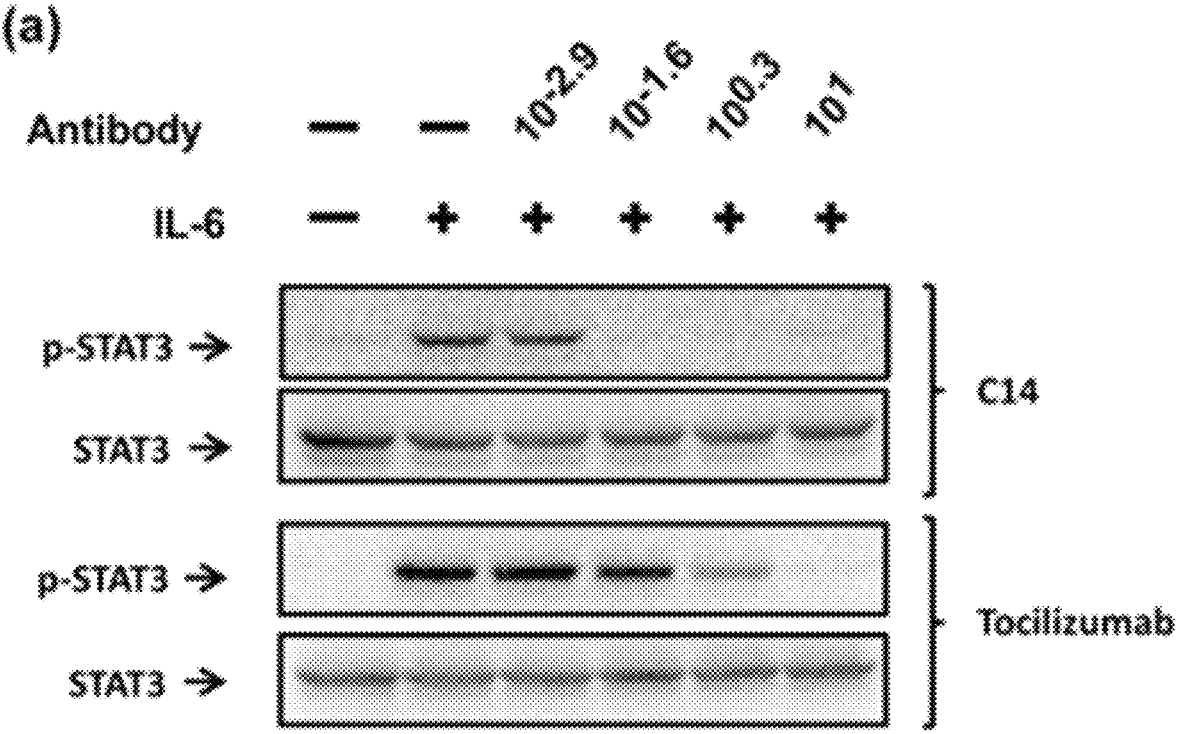
FIG. 6 illustrates the inhibitory profile of C14mab in various IL-6-mediated signalings. (a) HeLa cells ($1 \times 10^5$ cells/well) were serum-starved for 5 hrs before stimulation. IL-6 (30 ng/ml) was premixed with indicated concentrations of C14mab or Tocilizumab for 15 mins. Cells were treated with the mixtures for 15 mins and p-STAT3 was determined by Western blot (left panel). The inhibition data is analyzed by ImageJ software and graphed with p-STAT3 activity percentages vs. log antibody (right panel). (b) C33A cells ($1 \times 10^6$ cells/well) were serum-starved for 5 hrs before stimulation. IL-6 (100 ng/ml) and sIL-6 Rα (200 ng/ml) were mixed for 15 mins, then the IL-6/sIL-6R combination was incubated with indicated concentrations of C14mab, tocilizumab, or olokizumab for another 15 mins. Cells were treated with the mixtures for 15 mins and p-STAT3 was determined by Western blot. (c) For HyIL-6 mediated signaling blockade, HeLa cells ($1 \times 10^5$ cells/well) were stimulated with HyIL-6 (10 ng/ml) and indicated antibodies. The levels of p-STAT3 were determined by Western blot (left panel) and analyzed by Image J software (right panel) as described in (a). FIG. (a) Left: Western blot analysis of IL-6 with various C14mab and Tocilizumab concentrations. FIG. (a) Right: Line graphs plotting p-STAT3 activity percentages over log antibody (C14mab vs. Tocilizumab). FIG. (b) Western blot analysis of IL-6 and IL-6R with various C14mab, Tocilizumab, and Olokizumab concentrations. FIG. (c) Left: Western blot analysis of HyIL-6 with various C14mab and Tocilizumab concentrations. FIG. (c) Right: Line graphs plotting p-STAT3 activity percentages over log antibody (C14mab vs. Tocilizumab).
Figure 6:
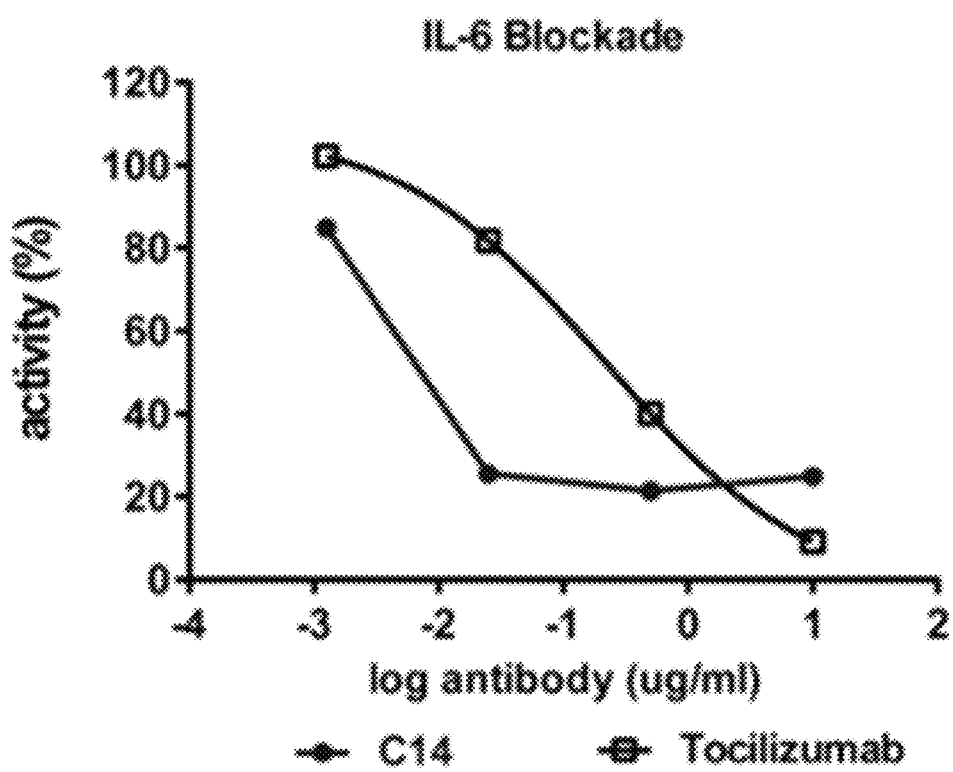
Figure 6:
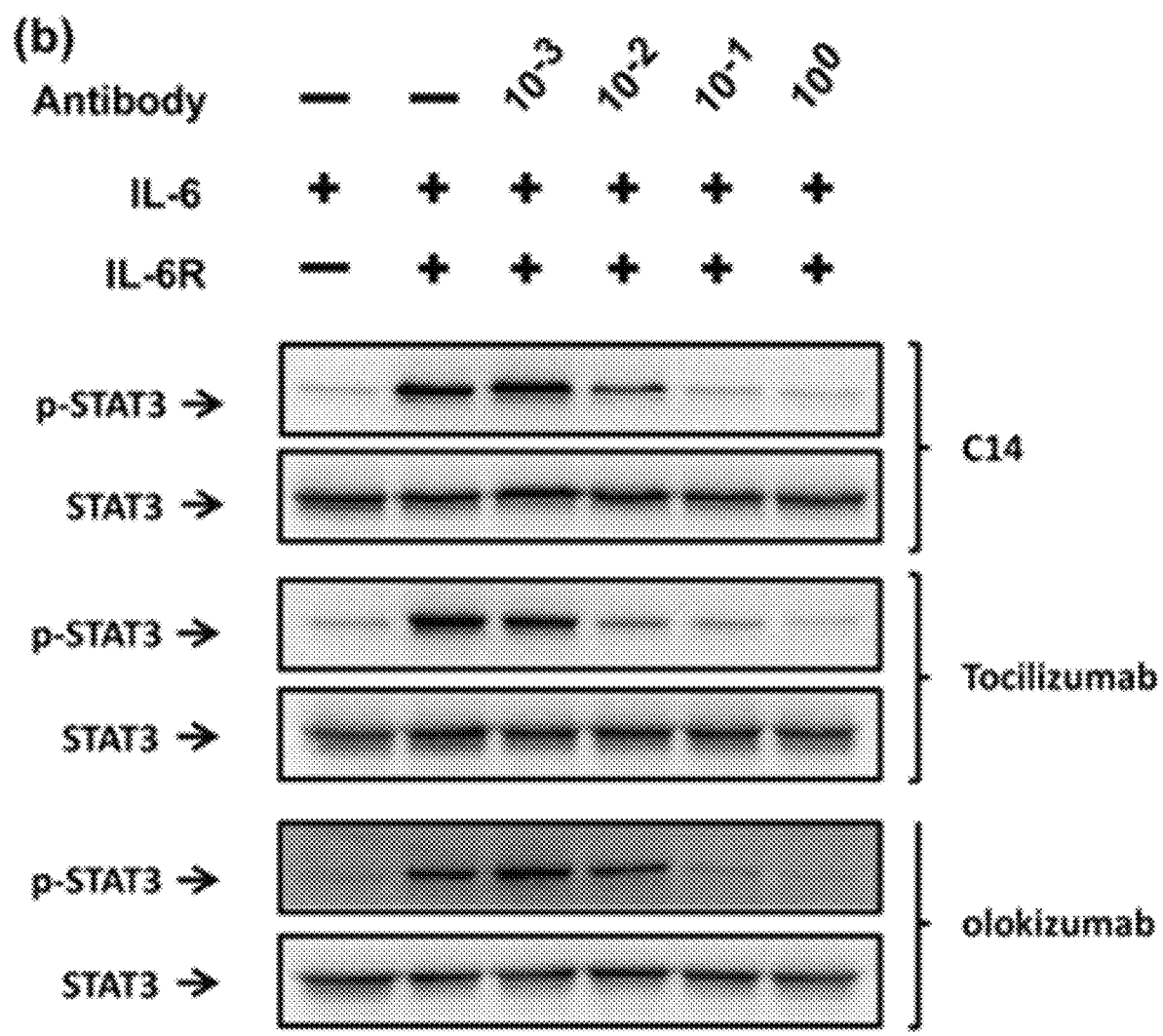
Figure 6:
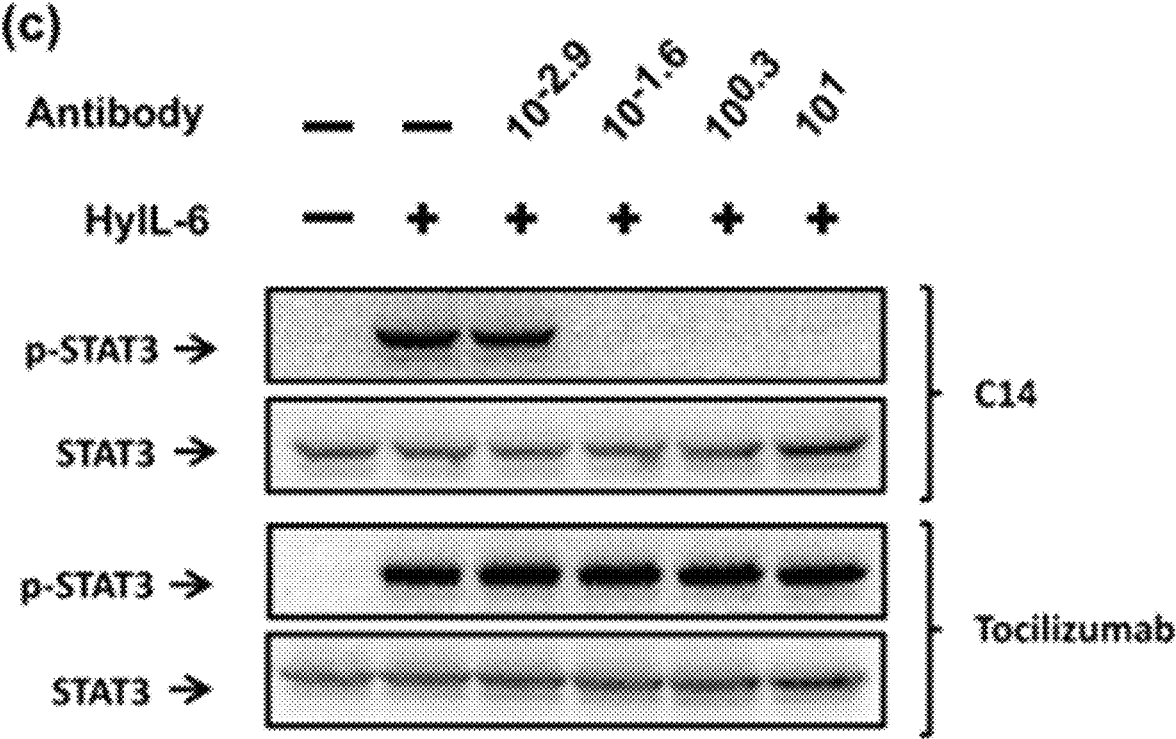
Figure 6:
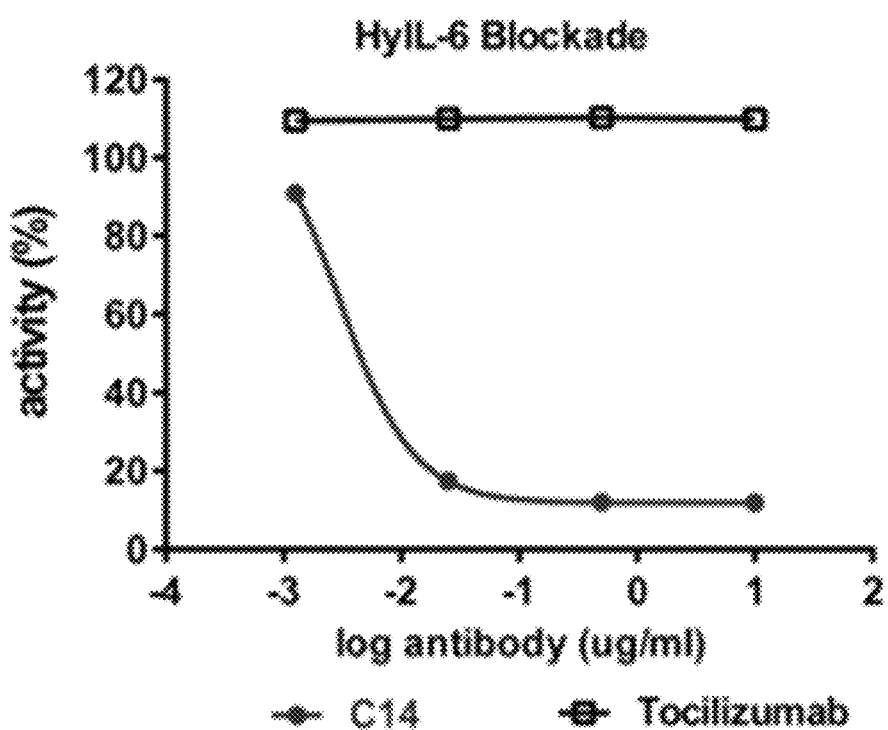

To validate the neutralization activity of C14mab, we compared the inhibitory characteristics of C14mab to Tocilizumab on IL-6 mediated p-STAT3 by immunoblot. FIG. 6(a) demonstrated that C14mab and Tocilizumab dose-dependently inhibit IL induced p-STAT3 in Hela cells, and C14mab shows a superior potency over Tocilizumab. The combination of IL-6 and sIL-6Rα significantly induced p-STAT3 in the IL-6Rα-null C33A cells, whereas IL-6 alone treatment did not. FIG. 6(b) demonstrated that C14mab, Tocilizumab, and Olokizumab substantially inhibit IL-6/sIL-6Rα combination mediated p-STAT3 induction in C33A cells. Like site 1 inhibitor, Tocilizumab is an anti-IL-6Rα antibody that inhibits the binding of free IL-6 to IL-6Rα. Tocilizumab, however, cannot prevent STAT3 activation initiated by the pre-existing IL-6/IL-6Rα complex (HyIL-6) (FIG. 6(c)). In contrast, C14mab inhibits HyIL-6 induced STAT3 activation in a dose-dependent manner, supporting its ability in preventing IL-6/IL-6Rα complex from binding to gp130 and initiate signaling (FIG. 6(c)).

Figure 7:
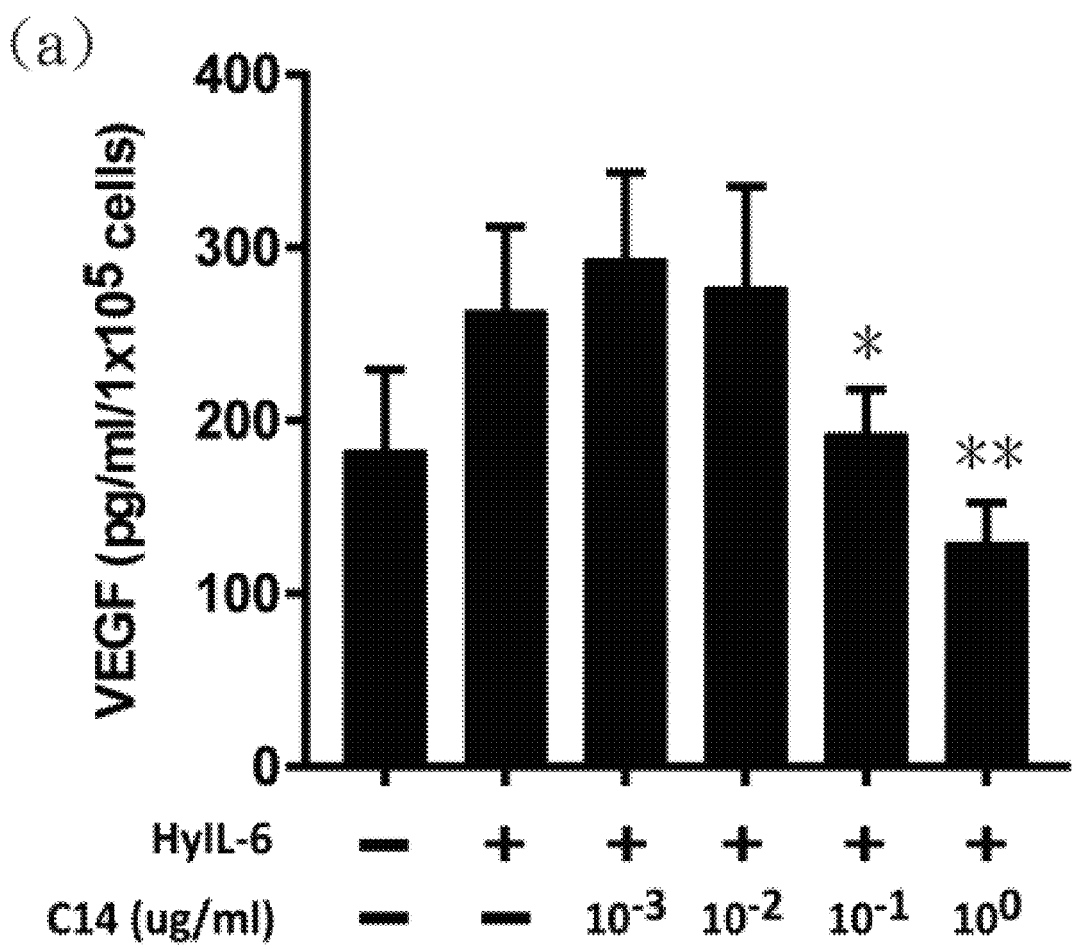
FIG. 7 illustrates the neutralization activity of C14mab. (a) C14mab inhibits HyIL-6 induced VEGF expression in C33A. VEGF protein expression was evaluated by ELISA in the culture supernatant of C33A cells after incubation under treatment with HyIL-6 (50 ng/ml) in the presence or absence of the indicated concentrations of C14mab. The culture media were collected for the determination of VEGF levels. Data expressed as mean±SD, n=4. * Statistically significant difference from the positive control; $P<0.05$.  Statistically significant difference from the positive control; $P<0.01$ (b) Wildtype naïve CD4+ T cells were stimulated with anti-CD3 and anti-CD28 for four days in the presence of TGF-β1 (2 ng/ml) and anti-IL-2 (10 ug/ml). HyIL-6 (50 ng/ml) mediated signaling was blocked in cultures using indicated concentrations of C14mab, tocilizumab, and olokizumab. IL-17A levels in culture supernatants were determined by ELISA (R&D Systems). Values represent the mean±SD: n=3.  Statistically significant differences from the positive control; $P<0.01$. (c) BALB/c mice were injected with either C14mab (0.1 mg/ml), DPBS, or isotype control antibody (0.1 mg/kg). After 1 hr, mice were challenged with recombinant human HyIL-6 (1 ug). After an additional 6 hrs, whole blood was collected. SAA levels were determined from serum by using the mouse SAA ELISA. (d) C14mab dose-dependently decreases HyIL-6 induced SAA levels in mice. BALB/c mice were injected with the indicated dose of C14mab. After 1 hr, mice were challenged with recombinant human HyIL-6 (1 ug). After an additional 6 hrs, whole blood was collected. SAA levels were determined from serum by using the mouse SAA ELISA. Data expressed as mean±SD, n=5. ** Statistically significant differences from the positive control; $P<0.01$.
Figure 7:
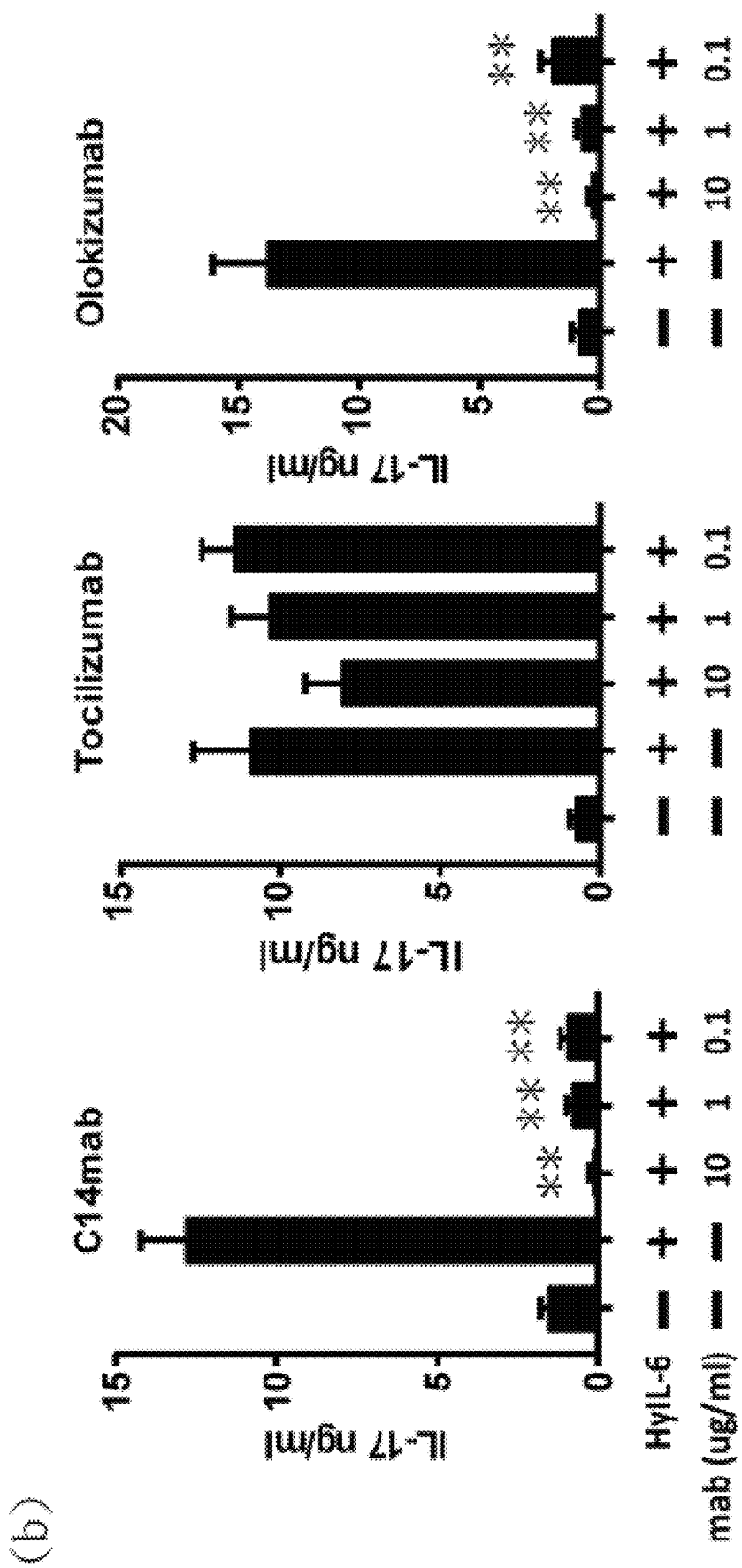
Figure 7:
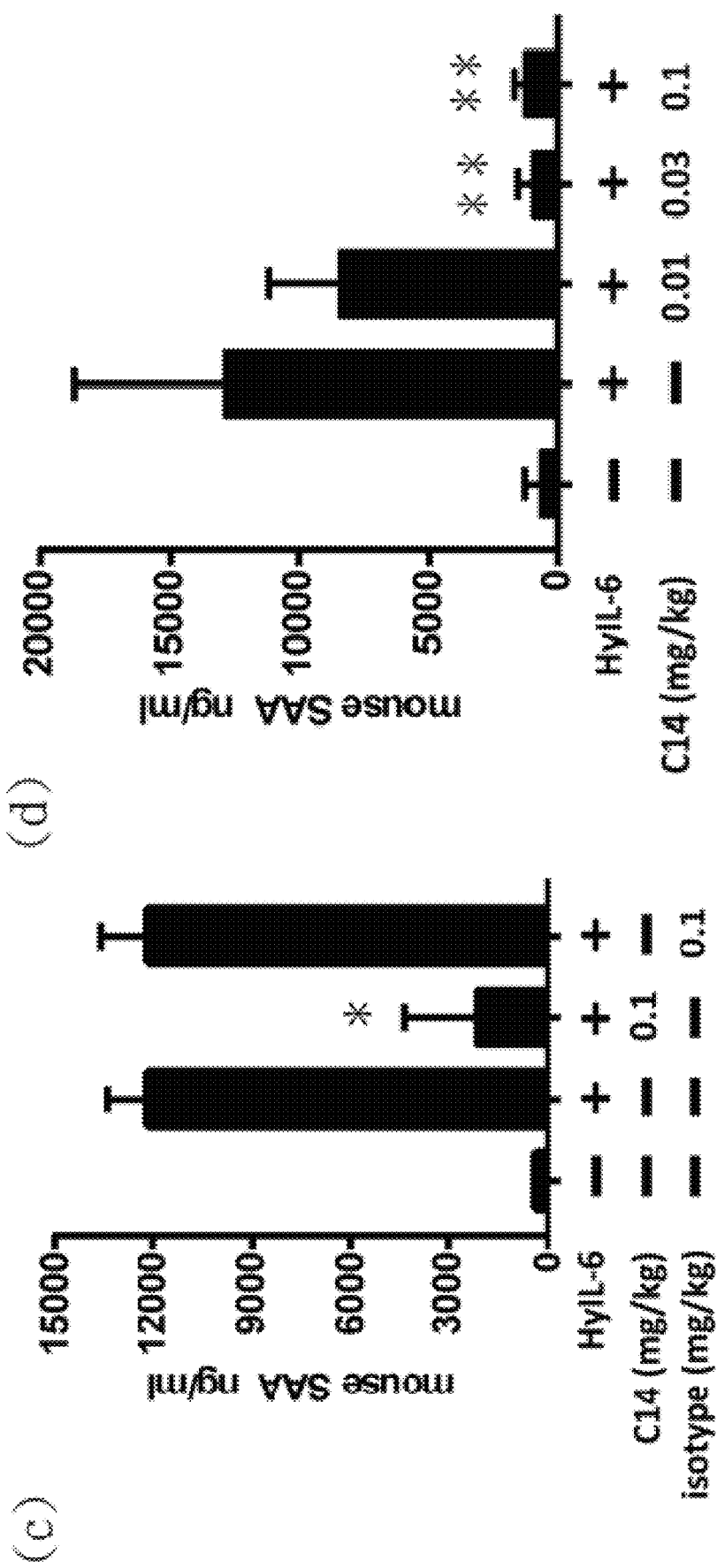

IL-6/HyIL-6 signaling links inflammation with angiogenesis. Induction of vascular endothelial growth factor (VEGF) is one of the significant STAT3 signaling downstream events. We, therefore, evaluated the effect of C14mab on HyIL-6 induced VEGF expression by ELISA. FIG. 7(a) reveals that HyIL-6 substantially induced VEGF production in C33A cells, which can be dose-dependently reduced by C14mab, with complete blockade when applying >0.1 µg/ml C14mab in C33A cells. Furthermore, IL-6 plays an obligatory role in generating IL-17A—secreting $CD4^+$ T cells (Th17 cells) through trans-signaling. FIG. 7(b) demonstrates that HyIL-6 supports the TGF-β—mediated differentiation of Th17 cells. In contrast to Tocilizumab, C14mab and Olokizumab remarkably inhibited IL-17 levels in culture supernatants in a dose-dependent manner (FIG. 7(b)).

IL-6 is the major inducer of hepatic acute phase proteins. To explore the efficacy of C14mab to abrogate IL-6 response in vivo, we examined serum levels of amyloid A (SAA), which is the primary acute phase protein and inflammation marker in mice. Upon intraperitoneal HyIL-6 injection, SAA levels substantially elevated 3 hours after stimulation in Balb/c mice. The C14mab significantly suppressed HyIL-6 elicited SAA production compared with the isotype control antibody (FIG. 7(c)). FIG. 7(d) demonstrates that C14mab abrogates HyIL-6 elicited SAA production in a dose-dependent manner in mice. At the dose above 0.1 mg/kg, our data showed that C14mab significantly suppresses SAA expression in mice. Collectively, our in vitro and in vivo assays demonstrated the profound efficacy of C14mab in neutralizing the IL-6 pathway.

Epitope Characterization of C14mab

Figure 8:
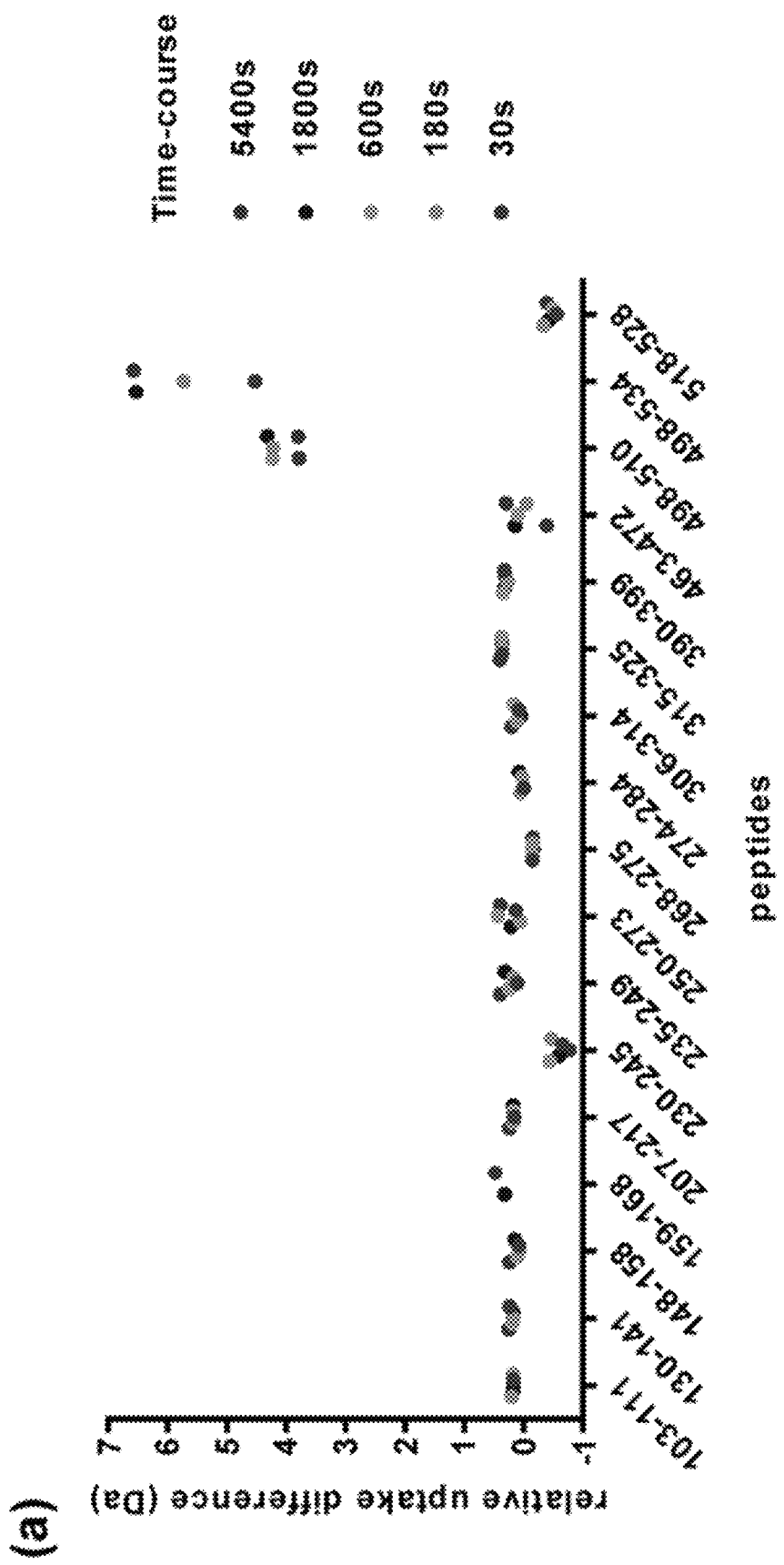
FIG. 8 illustrates the epitope of HyIL-6/C14mab interaction. (a) Differential HDX of HyIL-6 upon C14mab binding. A superimposed scatter plot shows pink, purple, green, Orange, blue, and red dots corresponding to data acquired at 30, 180, 600, 1800, and 5400 sec of deuteration. The sequence, $^{498}$LTKLQAQNQWLQD$^{510}$, upon C14mab binding shows significant HDX reduction compared to other sequences. (b) A scheme depicts the assay procedure (left panel). The microplates were coated with sIL-6 Rα (50 ng/well) in PBS buffer at 4° C. overnight and blocked with 1% BSA in PBS for 1 hr. Then plates were washed with PBS containing 0.05% Tween-20. Upper; without washing group, IL-6 (10 ng/well) was added for 1 hr at room temperature. Then serial dilution concentrations of C14mab were added directly for another 2 hrs. Lower; washing group, IL-6 (10 ng/well) was added for 1 hr at room temperature. After plates were washed with PBS containing 0.05% Tween-20, serial dilution concentrations of C14mab were added directly for another 1 hr. The bound C14mab was determined by ELISA. The binding results with or without washing before C14mab incubation are shown in blue and red, respectively (right panel). One representative assay of 3 is shown.
Figure 8:
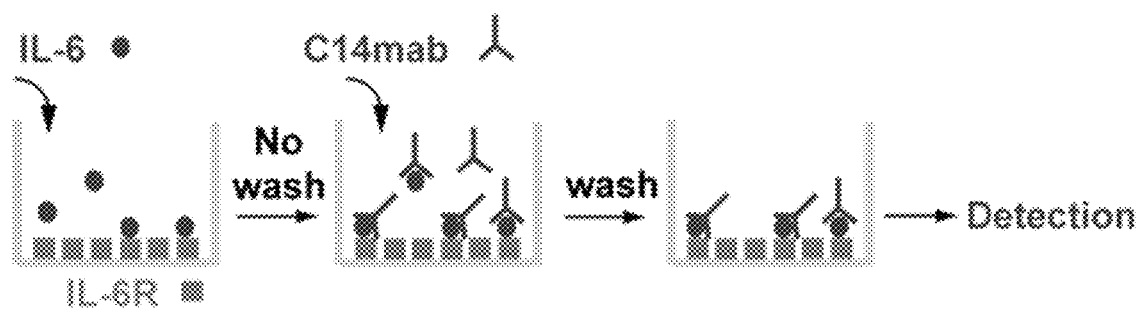
Figure 8:
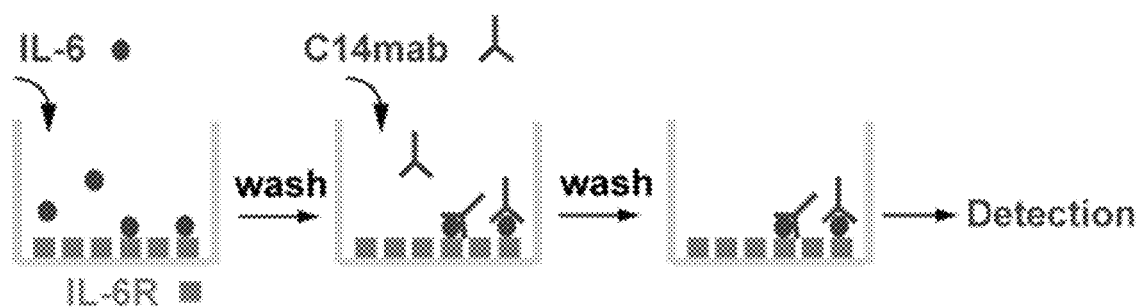
Figure 8:
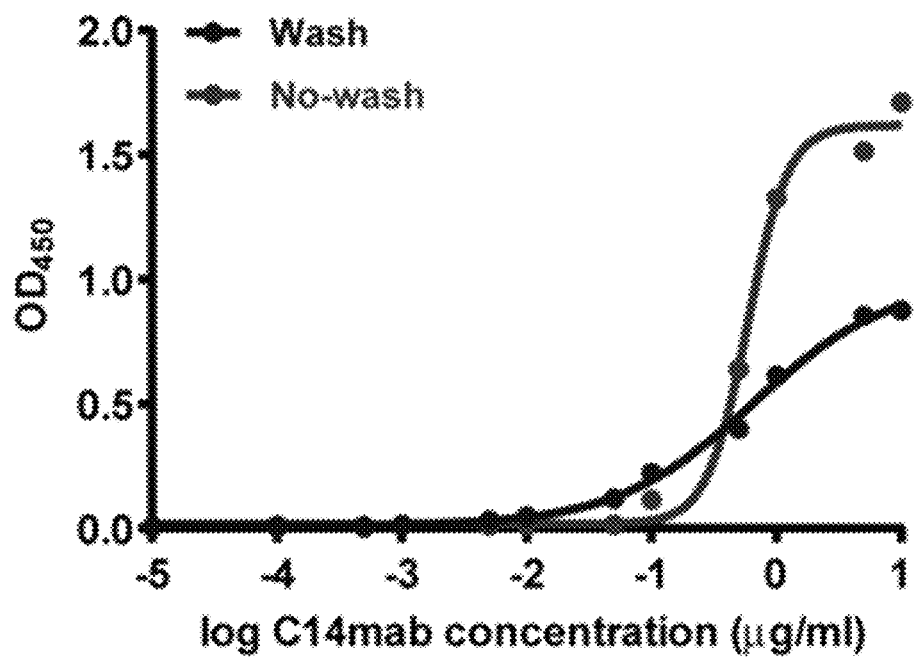

To obtain molecular details of the C14mab binding epitope, hydrogen/deuterium exchange mass spectrometry (HDX-MS) was applied to map the antibody's epitope by comparing the HDX for HyIL-6 with that for the C14mab/HyIL-6 complex. After the exchange reaction, the proteins were digested by pepsin, and the resulting peptides were analyzed by liquid chromatography-mass spectrometry. Our assay generated 30 HyIL-6 peptides covering 80.7% of the HyIL-6 sequence, which constitutes up to 89.2% of the functional epitopes of HyIL-6 involved in IL-6 hexamer formation. The differential HDX results of the HyIL-6 and C14mab/HyIL-6 complex are exhibited in FIG. 8(a). A reduction in the amount of deuterium exchange is indicative of protection of that region by a binding event. Several peptides, in regions 103-111, 130-141, 148-158, 159-168, 207-217, 235-249, 250-273, 274-284, 306-314, 315-325, and 390-399, demonstrated modest HDX reduction upon C14mab binding with a total <1 Da reduction, which were considered nonsignificant. Our HDX data revealed one essential region (composed of residues 498-510) as the potential binding epitope (FIG. 8(a)), which showed >70% deuterium exchange upon C14mab binding. These residues are located at gp130 interaction site Ma in IL-6, including the critical residue Trp157 of IL-6 in the site Ma interface.

Based on the kinetic analysis, C14mab exhibits stronger binding to HyIL-6 ($K_D$=0.286 nM) than IL-6 ($K_D$=1.13 nM), suggesting the interface between C14mab and HyIL-6 may span from IL-6 over to IL-6Rα. However, our HDX-MS measurements did not identify any potential binding epitopes in IL-6Rα, probably owing to the limited deuterium exchange levels under the experimental conditions. To further understand the C14mab binding mechanism in HyIL-6, we performed an indirect ELISA assay using C14mab as a detection antibody. Briefly, IL-6Rα was immobilized directly on the plate and then IL-6 was added to the IL-6Rα and allowed to bind. The unbound IL-6 was washed away and the IL-6/IL-6Rα complex was detected by C14mab (FIG. 8(b)). Notably, when C14mab was added without washing off unbound IL-6, the ELISA readout significantly increased (FIG. 8(b)), indicating C14mab changes the equilibrium state of the IL-6/IL-6Rα interaction. Overall, our data revealed C14mab recognizes and stabilizes the complex formed by IL-6 and IL-6Rα, instead of recognizing IL-6 alone.

Isotyping of C14mab

Figure 10:
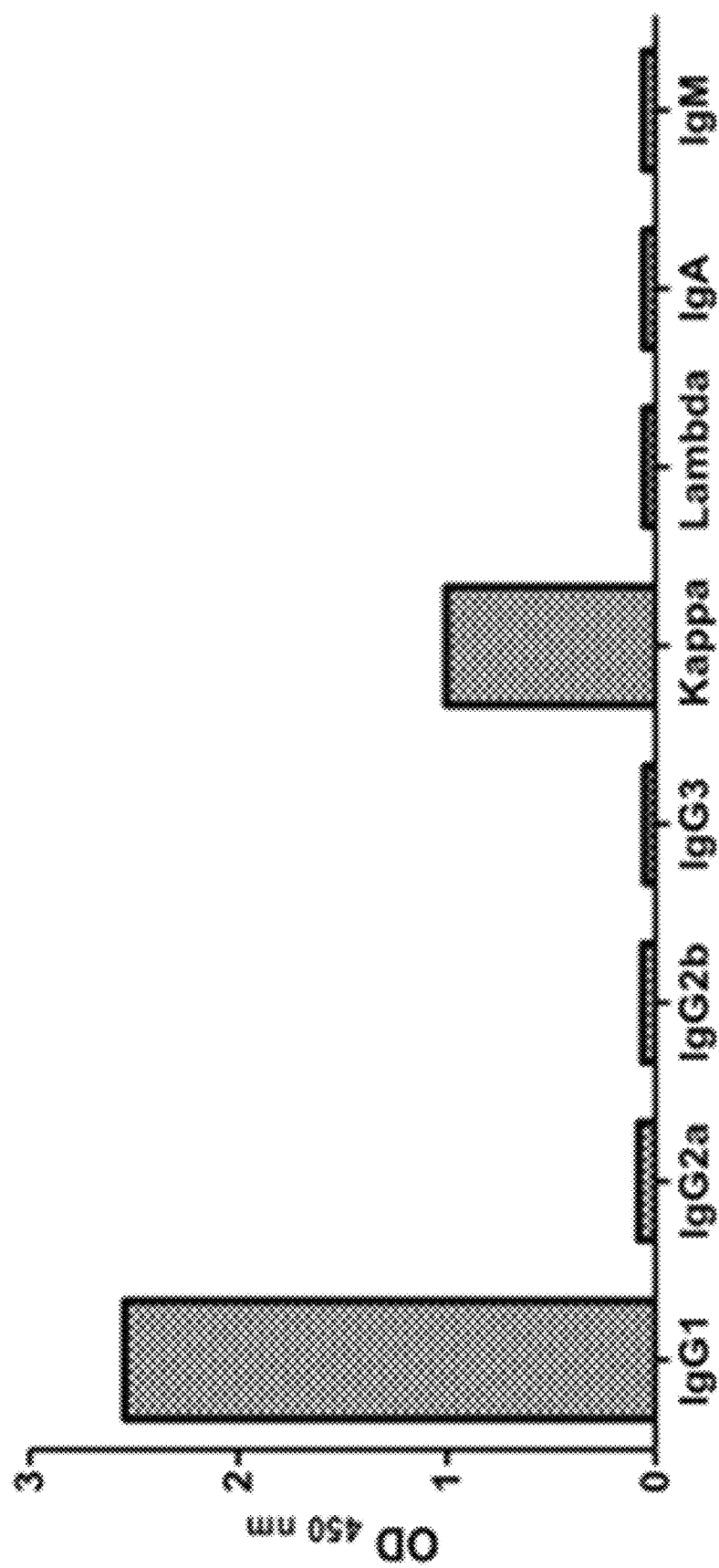
FIG. 10 illustrates the isotype of C14mab.

Determining the class (e.g., IgG vs. IgM) and subclass (e.g., IgG1 vs. IgG2a) identity of an antibody is especially important for choosing the method by which it should be purified and used in immunoassays in future studies. Therefore, we cultured the hybridoma clone of C14mab and identified the subtypes of the IgG heavy (H) and light (L) chains by commercial isotyping kit. As shown in FIG. 10, it is confirmed that the H chain of C14mab was IgG1, and the L chain was kappa.

DISCUSSION

Using the designer cytokine HyIL-6 as an antigen for immunization, the present invention have successfully screened an inhibitory antibody C14mab which possesses a distinct binding mode recognizing the fusion protein of sIL-6Rα/IL-6 and prevents the formation of the signaling-competent receptor complex with gp130. Both in vitro and in vivo functional assays show that C14mab potently inhibits IL-6-mediated signal transduction and biological activities. Data from ELISA binding assays and kinetics assays indicate that C14mab interacts simultaneously with IL-6 and IL-6Rα suggesting the C14mab binding surface spans across the interface of IL-6 and IL-6Rα either continuously or not. While C14mab binds to IL-6 alone, it does not have a measurable affinity for IL-6Rα alone. Notably, C14mab preferentially binds to the fusion protein of sIL-6Rα/IL-6 over IL-6 and increases the concentration at equilibrium of the IL-6/IL-6Rα complex while interfering with the recruitment of the signaling partner gp130. This characteristic of C14mab makes it a unique neutralizing antibody for IL-6, offering a different way of designing specific therapeutics for IL-6 blockade.

Figure 9:
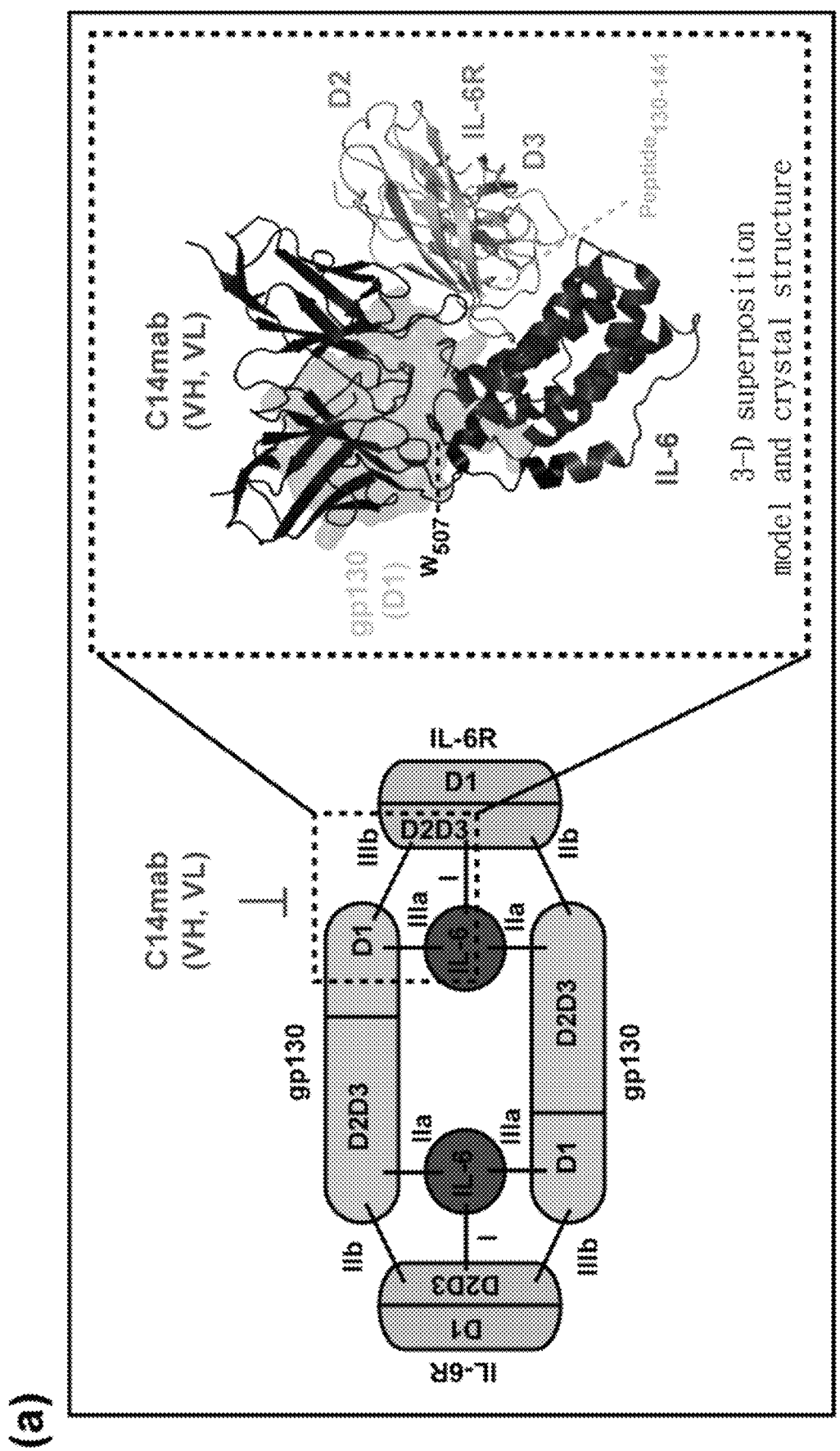
FIG. 9 illustrates the proposed model of IL-6/IL-6R/C14mab. (a) The three key interaction sites of IL-6, IL-6 R, and gp130 within the hexameric signaling complex are shown. The proposed model of IL-6/IL-6 R/C14mab and the trimeric structure of IL-6/IL-6 R/gp130 are superimposed. IL-6, IL-6 R, gp130, and C14mab are represented by a cartoon. The binding candidates are peptides 498-510 and peptides 130-141. The surface representation of gp130 domain I overlap with C14mab interacting on IL-6 and IL-6 R in space. (b) HDX-MS was applied to map the epitope of the C14mab onto HyIL-6 by comparing the H/D exchange for HyIL-6 with that for the HyIL-6-C14mab complex. IL-6R, linker, and IL-6 are peptides 1-339 (SEQ ID NO: 13), peptides 340-351 (SEQ ID NO: 14) and peptides 352-534 ((SEQ ID NO: 15), respectively. Candidate residues that are significantly reduced in the presence of C14mab are shown peptides 498-510 (SEQ ID NO: 1), while candidate residues with low reduction levels are peptides 130-141 (SEQ ID NO: 2). The sequences with a gray background are the peptide sequences involved in the binding of IL-6 to gp130 (site III).

The biophysical and structural analysis indicate that epitopes of the sIL-6Rα/IL-6 recognized by C14mab mainly lie within the IL-6 molecule. Data from HDX-MS revealed that C14mab targets site Ma of IL-6, encompassing the amino acid residue $W_{157}$, which is the critical aromatic site III signature residue involved in the final step in the assembly of the functional human IL-6 hexamer signaling complex. The present invention further analyzed the differential HDX-MS and the spatial distribution between pepsin-digested peptides and the amino acid residue $W_{507}$. Those peptides with properties of HyIL-6 deuterium level >25%, difference upon C14mab binding >9% and the distance from peptide to $W_{507}$<30 Å were considered as potential candidates for antibody binding epitopes. Only one, peptide$_{130-141}$, meets the above mentioned criteria. Accordingly, the present invention propose a complex model that consists of a homology model of the C14mab variable region, which spans a distance of about 30 Å and engages simultaneously IL-6 and IL-6Rα using its CDRs, superimposed onto the IL-6/IL-6Rα/gp130 structure (FIG. 9 (a)). The C14mab binding residues in the two distinct regions of the IL-6/IL-6Rα complex, peptide$_{498-510}$ (SEQ ID NO:1) and peptide$_{130-141}$ (SEQ ID NO:2) are within the approximate size of the variable domains of the heavy and light chains of C14mab (FIG. 9(b). These residues are located at the gp130 interaction site Ma in IL-6 and site IIIb in IL-6Rα, respectively. Moreover, C14mab and the gp130 D1 domain overlap significantly in space, indicating C14mab blocks the formation of IL-6/IL-6Rα/gp130 complex and subsequent signal transduction.

Sequential assembly of the IL-6/IL-6Rα/gp130 hexameric complex offers several alternatives for therapeutic intervention. Inhibitors that target different steps in the IL-6 signaling cascade have been developed. However, the question remains as to which of these modes of blockade is superior and whether this difference can translate into clinical benefit. Tocilizumab is the first FDA approved biologic targeting the IL-6 pathway for the treatment of rheumatoid arthritis. Tocilizumab recognizes both mIL-6Rα and sIL-6Rα and inhibits IL-6 signaling through competitive blockade of IL-6 binding. In comparison with anti-IL-6 antibodies, treatment of patients with anti-IL-6Rα antibodies prevents serum IL-6 accumulation and related adverse responses, such as fever, fatigue, and hypercalcemia. Nevertheless targeting a receptor like IL-6Rα instead of the individual cytokine IL-6 already reduces the specificity. It has been shown that human IL-6Rα binds not only to IL-6 but also to human CNTF and IL-30, indicating that the blockade of IL-6Rα might also affect other signaling pathways. Likewise, the example from Olamkicept that blocking IL-6 trans-signaling with sgp130Fc interferes with signaling elicited by the IL-11 trans-signaling pathway. The characteristic of C14mab's blockade of the IL-6/IL-6Rα complex but not IL-6Rα alone enables targeting a single signaling entity and does not interfere with the signaling of other cytokines in the IL-6 family.

Blockade of IL-6 offers the most direct mode of IL-6 inhibition without interfering with other cytokines that can signal through IL-6Rα. IL-6 has three distinct binding sites to bind to its receptor subunits. Most anti-IL-6 antibodies under clinical use/development, such as Siltuximab, Sirukumab, and Clazakizumab, are directed against site I to interfere with the initial binding of IL-6 to its membrane bound IL-6Rα or soluble IL-6Rα. Apparently, the site I blockade cannot discriminate between classic and trans-signaling. Moreover, site I blockade does not block IL-6 trans-presentation, which is required for the priming of pathogenic Tx 17 cells. Of note, Olamkicept efficiently inhibits trans-signaling, but not trans-presentation owing to steric hindrance. On the other hand, an anti-IL-6Rα MP16-1 which might interfere with the assembly of the IL-6/IL-6Rα/gp130 complex, suppresses IL-6 trans-presentation. In this context, non-site I blockade, like C14mab, theoretically suppresses classic and trans-signaling as well as trans-presentation, suggesting its potential therapeutic gap. Moreover, C14mab possesses a binding preference for IL-6/IL-6Rα complex compared to IL-6, and whether such a characteristic may relatively selectively blockade IL-6 activity instead of eliciting global IL-6 inhibition remains largely unknown. Further studies are needed to prove these concepts.

Experiment-Materials and Methods
Recombinant Protein

To construct and express the bioactive designer cytokine HyIL-6, a cassette consisting of human sIL-6Rα cDNA (corresponding to amino acid residues 113-323) and human IL-6 cDNA (corresponding to amino acid residues 30-212) fused by a synthetic DNA linker coding for the amino acid sequence Arg-Gly-Gly-Gly-Gly-Ser-Gly-Gly-Gly-Gly-Ser-Val-Glu was constructed by the PCR technique and cloned into the mammalian expression vector IgMu/pEF-BOS using the restriction enzymes NdeI and BamHI. Cleavage of the signal peptide in transfected mammalian cells leads to the secretion of HyIL-6 with a C-terminal 6 His-tag. The purified protein was used as immunogen for monoclonal antibody development. In addition, IL-6 (R&D systems), IL-6Rα (R&D systems), human IL-6Rα/IL-6 chimera (R&D systems) and mouse IL-6/IL-6Rα complex (R&D systems) were used for ELISA, cell function, in vivo model and kinetics assays.

Generation of Hybridoma Cell Lines & Antibody Discovery

HyIL-6 proteins were used for Balb/c mice injection. HyIL-6 protein was emulsified with adjuvant for antigen priming. After two weeks, HyIL-6 protein was combined with adjuvant and emulsified until it no longer separated. Mice were injected every week and followed by a breeding procedure for antibody titration. Indirect ELISA tested antibody titer after 3-4th boost injection. Mice with antibody titer larger than 1:10,000 were further used for hybridoma generation. Hybridoma preparation followed previous studies. After three rounds of limiting dilution, culture supernatants from hybridoma candidates were screened using indirect ELISA. Subsequently, selected candidates undergo expansion for large-scale antibody production and cryopreservation. Running IgG supernatant culture on SDS-PAGE compared to control, the IgG concentration of the supernatant was estimated and adjusted for normalization.

Competition Screening Assays

ELISA plates were coated with 100 ul of 10 ug/ml solution of purified sgp130-Fc (a gift from Stefan Rose-John, University of Kiel, Germany) in DPBS buffer. A mixture of 50 μl of the ligand (HyIL-6, 100 ng/ml) and 50 μl of supernatant from selected hybridomas were prepared in advance. 100 μL/well mixture was added and incubated for 1 hour at room temperature. Afterward, primary anti-sIL-6Rα mouse monoclonal antibody and HRP coupled goat anti-mouse IgG secondary antibody was incubated sequentially. Tetramethyl benzidine (TMB) solution (0.12 mg/mL TMB with 0.04% hydrogen peroxide in 25 mM $NaH_2PO_4$) was used as substrate. The reaction was stopped after 5 min with 1 M $H_2SO_4$. Optical density (OD) was measured at 450 nm with a reference of 630 nm.

ELISA Binding Assays

ELISA plates were coated with 100 ul of target proteins prepared in PBS buffer at 4° C. overnight and blocked with 1% BSA in PBS for an hour. After washing with PBS containing 0.05% Tween-20, serial dilution concentrations of analyte (culture supernatants, antibodies) were added for 1 hour at room temperature. After further washing, bound antibodies were revealed using goat anti-mouse IgG coupled to HRP. TMB substrates (100 ul) were added for 10-20 min, and then 50 ul stop solution (1N $H_2SO_4$) was added. Read the absorbance directly at 450 nm.

Antibody Expression and Purification

Hybridomas were cultured in a culture medium (high glucose DMEM, 10% FBS, 1% P/S) at 37° C. under 5% $CO_2$-enriched atmosphere. After the cultures reached about 80% confluence in 10-cm culture dishes, the 10% FBS medium was replaced by a serum-free medium (high glucose DMEM) for production of mAbs. IgG was purified from the culture supernatants using columns containing protein-A resins (GenScript). Immunoglobulins were eluted in 100 mM glycine. The purified C14mab is characterized using sodium dodecyl sulfate-polyacrylamide gel electrophoresis (SDS-PAGE), size-exclusion liquid chromatography, and thermal melting analysis. The antibody concentration was determined using a Bradford assay.

Cell Signaling Transduction Assay

Hela, C33A Cells ($1 \times 10^5$ cells/well, $1 \times 10^6$ cells/well) were seeded in 6-well tissue culture dishes and cultured overnight. After serum starvation for 5 hours, cells were stimulated with a pre-mixture containing IL-6 (R&D systems), IL-6/sIL-6Rα combination (R&D Systems), or HyIL-6 (R&D systems) with or without antibodies for 15 mins. The incubation time was 15 mins for each mixture period. Cells were washed with ice-cold PBS twice, and lysed in RIPA Buffer supplemented with protease and phosphatase inhibitor. Western blot analysis was performed using anti-pSTAT3 and anti-STAT3 antibodies (Cell Signaling technology). After incubation with HRP-labeled goat anti-rabbit (Cell Signaling technology) or HRP-labeled goat anti-mouse antibody (Cell Signaling technology), the membranes were detected by enhanced chemiluminescence HRP substrate (Merck).

Kinetics Assays

Octet is based on Bio-Layer Interferometry (BLI) for measuring protein-protein interactions. BLI analyzes the interference pattern of white light reflected from two surfaces: a layer of immobilized protein on the biosensor tip and an internal reference layer. The binding between C14mab immobilized on the biosensor tip surface using Biosensor AMC tips (ForteBio, Pall Corporation) and IL-6 (R&D systems) and HyIL-6 (R&D systems) in complex was measured. Interference patterns for the binding to or dissociating from the biosensor were measured in real time to generate a response profile on the Octet® System Octet 96 Red (ForteBio, Pall Corporation). Kinetic parameters were evaluated by using a 1:1 binding model with global fitting of three independent experiments with the Octet Red analysis software.

Cultured Cell VEGF Assay

Serum-starved C33A cells were cultured in 6-well plates ($1 \times 10^5$ cells per well) for 15 hours in un-supplemented MEM prior to stimulation. C33A cells were treated with recombinant human HyIL-6 (50 ng/ml, R&D Systems) in the presence or absence of antibody for 24 hours. The culture media were collected for the determination of VEGF levels. VEGF concentrations in the supernatant were measured by human VEGF DuoSet ELISA (R&D systems), and each measurement was repeated in triplicate.

In Vitro Expansion of Murine TH17 Cells

Mouse naïve CD4$^+$ T cells were isolated from the 6- to 8-week-old C57BL/6 mice using EasySep™ mouse CD4$^+$ T cell isolation kit (Stemcell). Cells were cultured in RPMI 1640 supplemented with 10% (v/v) FCS, 2 mM L-glutamine, 100 U/ml penicillin, 100 ug/ml streptomycin, 1 mM sodium pyruvate, and 50 µM β-mercaptoethanol (all from Invitrogen, Carlsbad, Calif.). A total of $2.5 \times 10^5$ cells/well were cultured in 96-well plates coated with anti-CD3 (2 µg/ml, R&D Systems) and anti-CD28 (10 µg/ml, BD Biosciences, San Jose, Calif.). Cultures were supplemented with TGF-β1 (2 ng/ml, R&D Systems), anti-IL-2 (10 µg/ml, R&D Systems) and HyIL-6 (50 ng/ml). Antibodies were included as indicated.

In Vivo Neutralization of HyIL-6 Induced SAA in Mice

Male Balb/c mice (Harlan Laboratories), weighing 23-27 g, were housed for 1 weeks before testing. Mice received an intraperitoneal administration of 0.01, 0.03, 0.1 mg/kg of C14mab, DPBS, or 0.1 mg/kg isotype control antibody (Biolegend) one hour before an intraperitoneal administration of 1 ug/mouse of human HyIL-6 (R&D systems). Blood was collected into Eppendorf tubes for preparation of plasma and evaluation of SAA levels by mouse serum amyloid A DuoSet ELISA (R&D systems).

HDX-MS

The hydrogen-deuterium exchange in target recombinant protein was measured by pepsin-digested fragments using HDX-MS in the presence and absence of the mouse monoclonal antibody. The recombinant protein (60 pmol) and protein-antibody complex (60 pmol: 72 µmol) were diluted in the exchange buffer (99.9% $D_2O$ in PBS, pH 7.4) at a ratio of 1:9 to initiate HD exchange at room temperature. At 6 time points (0 s, 30 s, 180 s, 600 s, 1800 s, 5400 s), an aliquot (10 pmol of target protein) was aspired and mixed with prechilled quenching buffer (to a final concentration of 1.7 M guanidine hydrochloride, 250 mM tris(2-carboxyethyl) phosphine, and 0.8% formic acid). The mixture was immediately loaded onto a homemade pepsin column for online digestion. The digested peptide mixtures were then loaded onto a reverse-phase column (Zorbax 300SB-C18, 0.3×5 mm; Agilent Technologies, Wilmington, Del., USA). The desalted peptides were then separated on a reverse-phase column (nanoEase M/Z Peptide BEH C18 300 Å, 1.7 µm, 100 µm I.D.×50 mm) using a multi-step linear gradient of 8%-95% HPLC buffer (99.5% acetonitrile/0.5% formic acid) for 10 minutes with a flow rate of 0.4 µl/min. The LC apparatus was coupled with a 2D linear ion trap mass spectrometer (Orbitrap Classic; Thermo Fisher, San Jose, Calif., USA) operated using Xcalibur 2.2 software (Thermo Fisher, San Jose, Calif., USA). The full-scan MS was performed in the Orbitrap over a range of 400 to 1,600 Da and a resolution of 30,000 at m/z 400. Internal calibration was performed using the ion signal of $[Si(CH_3)_2O]^6H+$ at m/z 445.1200 as lock mass. The electrospray voltage was set to 2.4 kV, and the temperature of the capillary was set to 220° C. MS and MS/MS automatic gain control were set to 1,000 ms (full scan) and 200 ms (MS/MS), or $2 \times 10^6$ ions (full scan) and $5 \times 10^3$ ions (MS/MS) for maximum accumulated time or ions, respectively.

Peptide Identification and HDX Data Analysis

The peptide identification was carried out using Proteome Discoverer software (version 2.3, Thermo Fisher Scientific). The MS/MS spectra were searched against the single protein database using the SEQUEST search engine. For peptide identification, 10 ppm mass tolerance was permitted for intact peptide masses, and 0.5 Da for CID fragment ions. Peptide-spectrum matches (PSM) were then filtered based on high confidence and search engine rank 1 of peptide identification to ensure an overall false discovery rate below 0.01. For HDX profile analysis, the peptide identification template was made based on the LC-MS/MS result of target protein identification. The template was then preloaded in the ExMS module installed in the MATLAB environment. The HDX-MS spectra were loaded and analyzed to calculate the number of incorporated deuterium atoms for each peptide, which was then presented as the average number of deuterium incorporation of three independent experiments.

```
Sequence of the C14mab
C14mab VH segment: heavy chain variable region
(base pairs: 363, amino acids: 121)
Nucleotide sequence (SEQ ID NO: 11):
GAAGTGAACCTTGAGGAGTCTGGAGGAGGCTTGGTGCAACCTGGAGG

ATCCATGCAACTCTCTTGTGCTGCCTCTGGATTCACTTTTAGTGACGCC

TGGATGGACTGGGTCCGCCAGTCTCCAGAGAAGGGGCTTGAGTGGGTT

GCTGAAGTTAGAACCAAAGGTTATTATCCTGTAACATTCTATGCTGAG

TCTGTGAAAGGGAGGTTCACCATCTCAAGAGATGATTCCAAAAGTAGT

GTCTACCTGCAAATGAACAGCTTAAGAGCTGAAGACACTGGCATTTAT

TACTGTACCAGGCCCCACTATGGGTACGGATACTTCGATGTCTGGGGC

GCAGGGACCACGGTCACCGTCTCCTCA

Amino acid sequence (SEQ ID NO: 10):
EVNLEESGGGLVQPGGSMQLSCAASGFTFSDAWMDWVRQSPEKGLEWV

AEVRTKGYYPVTFYAESVKGRFTISRDDSKSSVYLQMNSLRAEDTGIYYC

TRPHYGYGYFDVWGAGTTVTVSS
```

CDR1
(SEQ ID NO: 6)
GFTFSDAWMD

CDR2
(SEQ ID NO: 7)
EVRTKGYYPVTFYAESVKG

CDR3
(SEQ ID NO: 8)
TRPHYGYGYFDV

VL segment: light chain variable region
(base pairs: 336, amino acids: 112)
Nucleotide sequence (SEQ ID NO: 12):
GACATTGTGCTGACCCAATCTCCAGCTTCTTTGGCTGTGTCTCTAGGTC

AGAGGGCCACCATCTCCTGCAGAGCCAGCGAAAGTGTTGCTAATTTTG

GCATGAGTTTTATGAACTGGTTCCAACAGAAACCAGGACAGCCACCCA

AACTCCTCATCTATGGTGCATCCAACCAAGGATCCGGGGTCCCTGCCA

GGTTTAGTGGCAGTGGGTCTGGGACAGACTTCAGCCTCAACATCCATC

CTATGGAGGAGGATGATACTGCAATGTATTTCTGTCAGCAAAGTAAGG

AGGTTCCGTGGACGTTCGGTGGAGGCACCAAGCTGGAAATCAAGCGG

Amino acid sequence (SEQ ID NO: 9):
DIVLTQSPASLAVSLGQRATISCRASESVANFGMSFMNWFQQKPGQPPKL

LIYGASNQGSGVPARFSGSGSGTDFSLNIHPMEEDDTAMYFCQQSKEVPW

TFGGGTKLEIKR

CDR1
(SEQ ID NO: 3)
RASESVANFGMSFMN

CDR2
(SEQ ID NO: 4)
GASNQGS

CDR3
(SEQ ID NO: 5)
QQSKEVPWT

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

---

SEQUENCE LISTING

```
Sequence total quantity: 15
SEQ ID NO: 1           moltype = AA  length = 13
FEATURE                Location/Qualifiers
source                 1..13
                       mol_type = protein
                       organism = Homo sapiens
SEQUENCE: 1
LTKLQAQNQW LQD                                                          13

SEQ ID NO: 2           moltype = AA  length = 12
FEATURE                Location/Qualifiers
source                 1..12
                       mol_type = protein
                       organism = Homo sapiens
SEQUENCE: 2
LVRKFQNSPA ED                                                           12

SEQ ID NO: 3           moltype = AA  length = 15
FEATURE                Location/Qualifiers
source                 1..15
                       mol_type = protein
                       organism = synthetic construct
SEQUENCE: 3
RASESVANFG MSFMN                                                        15

SEQ ID NO: 4           moltype = AA  length = 7
FEATURE                Location/Qualifiers
source                 1..7
                       mol_type = protein
                       organism = synthetic construct
SEQUENCE: 4
GASNQGS                                                                 7

SEQ ID NO: 5           moltype = AA  length = 9
FEATURE                Location/Qualifiers
source                 1..9
                       mol_type = protein
                       organism = synthetic construct
SEQUENCE: 5
QQSKEVPWT                                                               9

SEQ ID NO: 6           moltype = AA  length = 10
FEATURE                Location/Qualifiers
source                 1..10
                       mol_type = protein
```

```
                        organism = synthetic construct
SEQUENCE: 6
GFTFSDAWMD                                                              10

SEQ ID NO: 7            moltype = AA   length = 19
FEATURE                 Location/Qualifiers
source                  1..19
                        mol_type = protein
                        organism = synthetic construct
SEQUENCE: 7
EVRTKGYYPV TFYAESVKG                                                    19

SEQ ID NO: 8            moltype = AA   length = 12
FEATURE                 Location/Qualifiers
source                  1..12
                        mol_type = protein
                        organism = synthetic construct
SEQUENCE: 8
TRPHYGYGYF DV                                                           12

SEQ ID NO: 9            moltype = AA   length = 112
FEATURE                 Location/Qualifiers
source                  1..112
                        mol_type = protein
                        organism = synthetic construct
SEQUENCE: 9
DIVLTQSPAS LAVSLGQRAT ISCRASESVA NFGMSFMNWF QQKPGQPPKL LIYGASNQGS        60
GVPARFSGSG SGTDFSLNIH PMEEDDTAMY FCQQSKEVPW TFGGGTKLEI KR               112

SEQ ID NO: 10           moltype = AA   length = 121
FEATURE                 Location/Qualifiers
source                  1..121
                        mol_type = protein
                        organism = synthetic construct
SEQUENCE: 10
EVNLEESGGG LVQPGGSMQL SCAASGFTFS DAWMDWVRQS PEKGLEWVAE VRTKGYYPVT        60
FYAESVKGRF TISRDDSKSS VYLQMNSLRA EDTGIYYCTR PHYGYGYFDV WGAGTTVTVS       120
S                                                                      121

SEQ ID NO: 11           moltype = DNA  length = 363
FEATURE                 Location/Qualifiers
source                  1..363
                        mol_type = other DNA
                        organism = synthetic construct
SEQUENCE: 11
gaagtgaacc ttgaggagtc tggaggaggc ttggtgcaac tggaggatc catgcaactc         60
tcttgtgctg cctctggatt cactttagt gacgcctgga tggactgggt ccgccagtct       120
ccagagaagg ggcttgagtg ggttgctgaa gttagaacca aaggttatta tcctgtaaca      180
ttctatgctg agtctgtgaa agggaggttc accatctcaa gagatgattc caaaagtagt      240
gtctacctgc aaatgaacag cttaagagct gaagacactg gcatttatta ctgtaccagg      300
ccccactatg gtacggata cttcgatgtc tggggcgcag gaccacggt caccgtctcc        360
tca                                                                    363

SEQ ID NO: 12           moltype = DNA  length = 336
FEATURE                 Location/Qualifiers
source                  1..336
                        mol_type = other DNA
                        organism = synthetic construct
SEQUENCE: 12
gacattgtgc tgacccaatc tccagcttct ttggctgtgt ctctaggtca gagggccacc        60
atctcctgca gagccagcga aagtgttgct aattttggca tgagttttat gaactggttc      120
caacagaaac caggacagcc acccaaactc ctcatctatg gtgcatccaa ccaaggatcc      180
ggggtccctg ccaggtttag tggcagtggg tctgggacag acttcagcct caacatccat      240
cctatggagg aggatgatac tgcaatgtat ttctgtcagc aaagtaagga ggttccgtgg      300
acgttcggtg gaggcaccaa gctggaaatc aagcgg                                336

SEQ ID NO: 13           moltype = AA   length = 339
FEATURE                 Location/Qualifiers
source                  1..339
                        mol_type = protein
                        organism = Homo sapiens
SEQUENCE: 13
LAPRRCPAQE VARGVLTSLP GDSVTLTCPG VEPEDNATVH WVLRKPAAGS HPSRWAGMGR        60
RLLLRSVQLH DSGNYSCYRA GRPAGTVHLL VDVPPEEPQL SCFRKSPLSN VVCEWGPRST       120
PSLTTKAVLL VRKFQNSPAE DFQEPCQYSQ ESQKFSCQLA VPEGDSSFYI VSMCVASSVG       180
SKFSKTQTFQ GCGILQPDPP ANITVTAVAR NPRWLSVTWQ DPHSWNSSFY RLRFELRYRA       240
ERSKTFTTWM VKDLQHHCVI HDAWSGLRHV VQLRAQEEFG QGEWSEWSPE AMGTPWTESR       300
SPPAENEVST PMQALTTNKD DDNILFRDSA NATSLPVQD                              339
```

```
SEQ ID NO: 14            moltype = AA  length = 12
FEATURE                  Location/Qualifiers
source                   1..12
                         mol_type = protein
                         organism = Homo sapiens
SEQUENCE: 14
GGGSGGGSGG GS                                                            12

SEQ ID NO: 15            moltype = AA  length = 183
FEATURE                  Location/Qualifiers
source                   1..183
                         mol_type = protein
                         organism = Homo sapiens
SEQUENCE: 15
VPPGEDSKDV AAPHRQPLTS SERIDKQIRY ILDGISALRK ETCNKSNMCE SSKEALAENN         60
LNLPKMAEKD GCFQSGFNEE TCLVKIITGL LEFEVYLEYL QNRFESSEEQ ARAVQMSTKV        120
LIQFLQKKAK NLDAITTPDP TTNASLLTKL QAQNQWLQDM TTHLILRSFK EFLQSSLRAL        180
RQM                                                                     183
```

What is claimed is:

1. A monoclonal antibody having specificity for the human interleukin-6 (IL-6)/interleukin-6 receptor (IL-6R) complex; wherein said monoclonal antibody comprises a light chain variable region (VL region) and a heavy chain variable region (VH region); wherein said VL region comprises a complementary determining region 1 (CDR-L1) comprising an amino acid sequence of SEQ ID NO: 3, a complementary determining region 2 (CDR-L2) comprising an amino acid sequence of SEQ ID NO: 4, and a complementary determining region 3 (CDR-L3) comprising an amino acid sequence of SEQ ID NO: 5; wherein said VH region comprises a complementary determining region 1 (CDR-H1) comprising an amino acid sequence of SEQ ID NO: 6, a complementary determining region 2 (CDR-H2) comprising an amino acid sequence of SEQ ID NO: 7, and a complementary determining region 3 (CDR-H3) comprising an amino acid sequence of SEQ ID NO: 8.

2. The monoclonal antibody according to claim 1, wherein said monoclonal antibody specifically binds to an epitope within IL-6, and said epitope comprises an amino acid sequence of SEQ ID NO: 1.

3. The monoclonal antibody according to claim 1, wherein said monoclonal antibody specifically binds to an epitope within IL-6R, and said epitope comprises an amino acid sequence of SEQ ID NO: 2.

4. The monoclonal antibody according to claim 1, wherein said VL region comprises an amino acid sequence of SEQ ID NO: 9.

5. The monoclonal antibody according to claim 4, wherein said VH region comprises an amino acid sequence of SEQ ID NO: 10.

6. A pharmaceutical composition comprising the monoclonal antibody according to claim 1.

7. A nucleic acid molecule encoding the monoclonal antibody according to claim 1.

8. A vector comprising the nucleic acid molecule according to claim 7.

9. A cell comprising the nucleic acid molecule according to claim 7 or expressing the nucleic acid molecule according to claim 7.

10. A method for treatment of IL-6/IL-6R mediated diseases comprising administering a therapeutically effective amount of the monoclonal antibody according to claim 1 to a subject in need of such treatment.

* * * * *